US012789468B2

(12) United States Patent
Jones et al.

(10) Patent No.: US 12,789,468 B2
(45) Date of Patent: Nov. 10, 2026

(54) ADDITIVE MANUFACTURING METHOD AND APPARATUS

(71) Applicant: RENISHAW PLC, Wotton-under-Edge (GB)

(72) Inventors: Nicholas Henry Hannaford Jones, Stroud (GB); Ceri Brown, Redland (GB); Ramkumar Revanur, Stafford (GB); Geoffrey Mcfarland, Wickwar (GB)

(73) Assignee: RENISHAW PLC, Wotton-under-Edge (GB)

( * ) Notice: Subject to any disclaimer, the term of this patent is extended or adjusted under 35 U.S.C. 154(b) by 596 days.

(21) Appl. No.: 17/970,779

(22) Filed: Oct. 21, 2022

(65) Prior Publication Data

US 2023/0042539 A1 Feb. 9, 2023

Related U.S. Application Data

(63) Continuation of application No. 17/159,552, filed on Jan. 27, 2021, now abandoned, which is a (Continued)

(30) Foreign Application Priority Data

Nov. 16, 2015 (IN) ........................... 3729/DEL/2015
Nov. 16, 2015 (IN) ........................... 3730/DEL/2015

(Continued)

(51) Int. Cl.
*B29C 64/393* (2017.01)
*B22F 10/00* (2021.01)

(Continued)

(52) U.S. Cl.
CPC ............ *B29C 64/393* (2017.08); *B22F 10/00* (2021.01); *B22F 10/30* (2021.01); *B22F 10/32* (2021.01);

(Continued)

(58) Field of Classification Search
None
See application file for complete search history.

(56) References Cited

U.S. PATENT DOCUMENTS 5,182,715 A 1/1993 Vorgitch et al.
5,225,883 A 7/1993 Carter et al.

(Continued)

FOREIGN PATENT DOCUMENTS

CN 1406376 A 3/2003
CN 101918198 A 12/2010

(Continued)

OTHER PUBLICATIONS

Apr. 26, 2017 International Search Report issued in International Patent Application No. PCT/GB2016/053558.

(Continued)

*Primary Examiner* — Ryan A Jarrett
(74) *Attorney, Agent, or Firm* — Oliff PLC

(57) ABSTRACT

A method of monitoring an additive manufacturing apparatus. The method includes receiving one or more sensor signals from the additive manufacturing apparatus during a build of a workpiece, comparing the one or more sensor signals to a corresponding acceptable process variation of a plurality of acceptable process variations and generating a log based upon the comparisons. Each acceptable process variation of the plurality of acceptable process variations is associated with at least one state of progression of the build of the workpiece and the corresponding acceptable process variation is the acceptable process variation associated with (Continued)

the state of progression of the build when the one or more sensor signals are generated.

23 Claims, 12 Drawing Sheets

Related U.S. Application Data continuation of application No. 15/767,475, filed as application No. PCT/GB2016/053558 on Nov. 14, 2016, now Pat. No. 10,933,468.

(30) Foreign Application Priority Data

Jan. 5, 2016 (EP) .................................... 16150243
Jan. 5, 2016 (GB) .................................... 1600122

(51) Int. Cl.

| | |
|---|---|
| ***B22F 10/10*** | (2021.01) |
| ***B22F 10/28*** | (2021.01) |
| ***B22F 10/30*** | (2021.01) |
| ***B22F 10/32*** | (2021.01) |
| ***B22F 10/322*** | (2021.01) |
| ***B22F 12/49*** | (2021.01) |
| ***B22F 12/70*** | (2021.01) |
| ***B22F 12/90*** | (2021.01) |
| ***B29C 64/153*** | (2017.01) |
| ***B29C 64/245*** | (2017.01) |
| ***B29C 64/268*** | (2017.01) |
| ***B33Y 10/00*** | (2015.01) |
| ***B33Y 30/00*** | (2015.01) |
| ***B33Y 50/02*** | (2015.01) |
| ***G05B 19/4093*** | (2006.01) |

(52) U.S. Cl.

CPC ............ *B22F 10/322* (2021.01); *B22F 12/90* (2021.01); *B29C 64/153* (2017.08); *B29C 64/245* (2017.08); *B29C 64/268* (2017.08); *B33Y 30/00* (2014.12); *B33Y 50/02* (2014.12); *G05B 19/4093* (2013.01); *B22F 10/10* (2021.01); *B22F 10/28* (2021.01); *B22F 12/49* (2021.01); *B22F 12/70* (2021.01); *B33Y 10/00* (2014.12); *Y02P 10/25* (2015.11)

(56) References Cited

U.S. PATENT DOCUMENTS

| | | | | |
|---|---|---|---|---|
| 6,126,884 | A | 10/2000 | Kerekes et al. | |
| 6,325,961 | B1 | 12/2001 | Beers et al. | |
| 6,930,278 | B1 | 8/2005 | Chung et al. | |
| 7,537,722 | B2 | 5/2009 | Andersson et al. | |
| 7,640,125 | B2 | 12/2009 | D'Angelo et al. | |
| 7,840,297 | B1 | 11/2010 | Tuszynski | |
| 8,137,739 | B2 | 3/2012 | Philippi et al. | |
| 9,370,877 | B2 | 6/2016 | Halford | |
| 9,803,966 | B2 | 10/2017 | Pettersson et al. | |
| 10,220,565 | B2 | 3/2019 | El-Siblani | |
| 10,265,912 | B2 | 4/2019 | Herzog et al. | |
| 10,317,294 | B2 | 6/2019 | Dave et al. | |
| 10,520,372 | B2 | 12/2019 | Dave et al. | |
| 10,520,427 | B2 | 12/2019 | Hess et al. | |
| 10,900,890 | B2 | 1/2021 | Hess et al. | |
| 11,020,954 | B2 | 6/2021 | Xu | |
| 11,931,955 | B2 | 3/2024 | Hess et al. | |
| 2002/0111770 | A1 | 8/2002 | Kalvin et al. | |
| 2003/0058777 | A1 | 3/2003 | Martynov et al. | |
| 2004/0026389 | A1 | 2/2004 | Kessler et al. | |
| 2004/0026807 | A1 | 2/2004 | Andersson et al. | |
| 2004/0094728 | A1 | 5/2004 | Herzog et al. | |
| 2004/0254665 | A1 | 12/2004 | Fink et al. | |
| 2006/0032480 | A1 | 2/2006 | Bader | |
| 2009/0101817 | A1* | 4/2009 | Ohshima ................. | H01J 37/28 250/310 |
| 2009/0206065 | A1 | 8/2009 | Kruth et al. | |
| 2010/0118137 | A1 | 5/2010 | Avila et al. | |
| 2010/0224772 | A1 | 9/2010 | Lemieux et al. | |
| 2011/0255847 | A1 | 10/2011 | Ji | |
| 2012/0038763 | A1 | 2/2012 | Kawada et al. | |
| 2012/0185434 | A1 | 7/2012 | Giampaolo et al. | |
| 2013/0112672 | A1 | 5/2013 | Keremes et al. | |
| 2013/0168902 | A1 | 7/2013 | Herzog et al. | |
| 2013/0178953 | A1 | 7/2013 | Wersborg et al. | |
| 2013/0199748 | A1 | 8/2013 | Christensen et al. | |
| 2013/0316081 | A1 | 11/2013 | Kovalcik et al. | |
| 2013/0343947 | A1 | 12/2013 | Satzger et al. | |
| 2014/0042137 | A1 | 2/2014 | Daniel et al. | |
| 2014/0265046 | A1 | 9/2014 | Burris et al. | |
| 2014/0355818 | A1 | 12/2014 | Scholz et al. | |
| 2015/0037601 | A1 | 2/2015 | Blackmore | |
| 2015/0048064 | A1 | 2/2015 | Cheverton et al. | |
| 2015/0088295 | A1 | 3/2015 | Hellestam | |
| 2015/0321422 | A1 | 11/2015 | Boyer | |
| 2016/0018320 | A1 | 1/2016 | Hess et al. | |
| 2016/0098825 | A1 | 4/2016 | Dave et al. | |
| 2016/0169821 | A1 | 6/2016 | Meyer et al. | |
| 2016/0184893 | A1* | 6/2016 | Dave ..................... | B29C 64/393 419/53 |
| 2017/0341183 | A1 | 11/2017 | Buller et al. | |
| 2019/0143413 | A1 | 5/2019 | Dave et al. | |

FOREIGN PATENT DOCUMENTS

| | | | |
|---|---|---|---|
| CN | 102770255 | A | 11/2012 |
| CN | 103025507 | A | 4/2013 |
| CN | 103299602 | A | 9/2013 |
| CN | 104094321 | A | 10/2014 |
| CN | 104729439 | A | 6/2015 |
| DE | 10004049 | A1 | 8/2000 |
| DE | 10 2004 0177 69 | A1 | 12/2004 |
| DE | 10 2011 009 624 | A1 | 8/2012 |
| EP | 1 026 564 | A2 | 8/2000 |
| EP | 1 134 565 | A1 | 9/2001 |
| EP | 1 466 718 | A2 | 10/2004 |
| EP | 1 486 317 | A1 | 12/2004 |
| EP | 2 271 073 | A2 | 1/2011 |
| EP | 2 771 140 | A2 | 9/2014 |
| EP | 2 829 386 | A1 | 1/2015 |
| EP | 2832475 | A2 | 2/2015 |
| EP | 2848392 | A1 | 3/2015 |
| EP | 2 917 797 | A2 | 9/2015 |
| EP | 3034207 | A1 | 6/2016 |
| GB | 2 491 472 | A | 12/2012 |
| JP | H11-198235 | A | 7/1999 |
| JP | 2003-531034 | A | 10/2003 |
| JP | 2008-155538 | A | 7/2008 |
| JP | 2009-220576 | A | 10/2009 |
| JP | 2013-067018 | A | 4/2013 |
| WO | 98/0594 | A1 | 1/1998 |
| WO | 2007/147221 | A1 | 12/2007 |
| WO | 2007/147332 | A1 | 12/2007 |
| WO | 2009/003702 | A1 | 1/2009 |
| WO | 2010/007394 | A1 | 1/2010 |
| WO | 2010/007396 | A1 | 1/2010 |
| WO | 2010/026396 | A1 | 1/2010 |
| WO | 2012/019577 | A2 | 2/2012 |
| WO | 2012/100766 | A1 | 8/2012 |
| WO | 2013/037346 | A1 | 3/2013 |
| WO | 2013/060981 | A2 | 5/2013 |
| WO | 2013/156119 | A1 | 10/2013 |
| WO | 2014/074947 | A2 | 5/2014 |
| WO | 2014/135141 | A1 | 9/2014 |
| WO | 2014/199134 | A1 | 12/2014 |
| WO | 2014/207454 | A1 | 12/2014 |
| WO | 2015/040433 | A2 | 3/2015 |
| WO | 2015/120047 | A1 | 8/2015 |
| WO | 2015/140547 | A1 | 9/2015 |
| WO | 2015/148702 | A1 | 10/2015 |
| WO | 2015/157381 | A1 | 10/2015 |
| WO | 2015/195909 | A1 | 12/2015 |

(56) References Cited

FOREIGN PATENT DOCUMENTS

| | | | |
|---|---|---|---|
| WO | 2016/079494 | A2 | 5/2016 |
| WO | 2016/079494 | A3 | 7/2016 |
| WO | 2016/115284 | A1 | 7/2016 |
| WO | 2016/198885 | A1 | 12/2016 |

OTHER PUBLICATIONS

Apr. 26, 2017 Written Opinion issued in International Patent Application No. PCT/GB2016/053558.
Feb. 8, 2016 Extended European Search Report issued in European Patent Application No. 16150243.0.
Clijsters, S., et al. "In situ quality control of the selective laser melting process using a high-speed, real-time melt pool monitoring system", International Journal of Advanced Manufacturing Technology, vol. 75, No. 5-8, pp. 1089-1101, 2014.
Foster, B. K., et al. "A brief survey of sensing for metal-based powder bed fusion additive manufacturing", Optomechatronic Micro/Nano Devices and Components III: 8-10, vol. 9489, pp. 94890B1-94890B9, 2015.
Feb. 24, 2016 Search Report issued in British Patent Application No. 1600122.4.
Feb. 24, 2017 International Search Report issued in International Patent Application No. PCT/GB2016/053559.
Feb. 24, 2017 Written Opinion of the International Searching Authority issued in International Patent Application No. PCT/GB2016/053559.
Doubenskaia, Maria et al. "Optical System for On-Line Monitoring and Temperature Control in Selective Laser Melting Technology". Key Engineering Materials, vol. 437, pp. 458-461, 2010.
Lott, Phillip et al. "Design of an Optical system for the In Situ Process Monitoring of Selective Laser Melting (SLM)". ScienceDirect, Physics Procedia 12, pp. 683-690, 2011.
May 6, 2020 Office Action Issued in U.S. Appl. No. 15/767,475.
Oct. 27, 2020 Notice of Allowance Issued in U.S. Appl. No. 15/767,475.
Gibson, Ian "Low-Cost Machine Vision Monitoring of the SLS Process."
Hudak, Radovan et al. "Material and Thermal Analysis of Laser Sintered Products". Acta Mechanica et Automatic. vol. 7, 2013.
Aug. 5, 2022 Office Action Issued in U.S. Appl. No. 17/159,552.

* cited by examiner

ADDITIVE MANUFACTURING METHOD AND APPARATUS

CROSS-REFERENCE TO RELATED APPLICATIONS

This application is a continuation application of U.S. application Ser. No. 17/159,552, filed Jan. 27, 2021, which is a continuation application of U.S. application Ser. No. 15/767,475, filed Apr. 11, 2018, which is a national stage application of PCT/GB2016/053558, filed on Nov. 14, 2016. The entireties of these applications are incorporated herein by reference.

FIELD OF INVENTION

This invention concerns an additive manufacturing method and apparatus and, in a particular, a method and apparatus for monitoring, and optionally, controlling an additive manufacturing process.

BACKGROUND

Additive manufacturing or rapid prototyping methods for producing parts comprise layer-by-layer solidification of a flowable material. There are various additive manufacturing methods, including powder bed systems, such as selective laser melting (SLM), selective laser sintering (SLS), electron beam melting (EBM) and stereolithography, and non-powder bed systems, such as fused deposition modelling, including wire arc additive manufacturing.

In selective laser melting, a powder layer is deposited on a powder bed in a build chamber and a laser beam is scanned across portions of the powder layer that correspond to a cross-section (slice) of the workpiece being constructed. The laser beam melts or sinters the powder to form a solidified layer. After selective solidification of a layer, the powder bed is lowered by a thickness of the newly solidified layer and a further layer of powder is spread over the surface and solidified, as required. In a single build, more than one workpiece can be built, the parts spaced apart in the powder bed.

Various systems have been developed for monitoring the additive manufacturing process. For example, WO2015/040433 discloses apparatus and methods for monitoring the melt pool through the optical module for steering the laser beam. PCT/GB2016/051720, which is incorporated herein by reference, discloses the use of passive acoustic sensors for sensing attributes of the additive process.

S. Clijsters. T. Craeghs, S. Buls, K. Kempen, J-P. Kruth (2014), "In situ quality control of the selective laser melting process using a high-speed, real-time melt pool monitoring system", International Journal of Advanced Manufacturing Technology, 1089-1101, discloses a system that enables the operator to monitor the quality of an SLM job on-line and estimate the quality of the part. To validate the quality, expected sensor values of the melt pool are predefined. Such a reference value is predicted from empirical results. A population of the sensor values for fill and contour scan vectors can be used to calculate statistical parameters, such as the mean value and standard deviation of the population distribution for a certain vector class. In addition to these standard parameters, a confidence interval can be calculated on the reference data, which can simplify the interpretation process. The confidence interval is the basis for the quality estimation.

It is desirable to provide improved in-process control of an additive manufacturing process.

SUMMARY OF INVENTION

According to a first aspect of the invention there is provided a method of monitoring an additive manufacturing apparatus comprising receiving one or more sensor signals from the additive manufacturing apparatus during a build of a workpiece, comparing the one or more sensor signals to a corresponding acceptable process variation of a plurality of acceptable process variations and generating a log based upon the comparisons, wherein each acceptable process variation of the plurality of acceptable process variations is associated with a state of progression of the build of the workpiece and the corresponding acceptable process variation is the acceptable process variation associated with the state of progression of the build when the one or more sensor signals are generated.

In this way, the plurality of acceptable process variation can be bespoke to a build of the workpiece taking into account how factors, such as a geometry of the workpiece, which affect the acceptable process variation as the build progresses. The acceptable variation may comprise variations in the sensor signals themselves or values derived from the sensor signals.

The acceptable process variation may vary with build time and/or position in the build volume and/or in the workpiece. The state of progression of the build of the workpiece may comprise a position on the workpiece/in a build volume or a time from a set event in the build (a time zero). The time zero may be a time at which the build begins (e.g. the first instructions of the build is executed) or a time at which the apparatus begins to consolidate material of a layer. The set event may be chosen such that the subsequent event, during which the one or more sensor signals are generated, occurs a sufficiently predetermined time after the set event such that time becomes a proxy for position with the required resolution. This may simplify the collection of sensor data and identification of the corresponding acceptable process variation to which the sensor data is to be compared as it is simply required to record a time at which the sensor signals are generated rather than a position of an element (such as steerable optics and/or z-position of the build platform) of the additive manufacturing apparatus at the time the sensor signals are generated. In one embodiment, the plurality of acceptable process variations is in an ordered list and the sensor signals are generated in a known order during the build, wherein an order of the plurality of acceptable process variations corresponds to an order in which the sensor signals are generated.

The additive manufacturing apparatus may comprise an energy beam and/or plasma jet for consolidating material and the method may comprise determining a position (in the workpiece or in the build volume of the additive manufacturing apparatus) of material consolidated by the energy beam and/or plasma jet when the sensor signals are generated and determining the corresponding acceptable process variation to compare to the sensor signals from the determined position.

The additive manufacturing apparatus may comprise a movable build support, wherein layers are consolidated to form the workpiece on the build support, the method comprising determining a current layer number being processed during generation of the one or more sensor signals and determining the corresponding acceptable process variation to compare to the sensor signals from the determined layer number.

The method may comprise determining a time in the build when the sensor signals are generated and determining the corresponding acceptable process variation to compare to the sensor signals from the determined time.

The method may comprise determining an order in which the sensor signals are generated and determining the corresponding acceptable process variation to compare to the sensor signals from the determined order.

The acceptable process variation may comprise acceptable variations in one or more of:

a) a temperature in a build chamber of the additive manufacturing apparatus
b) a temperature of flowable material to be consolidated
c) a temperature of a melt pool
d) intensity of light collected by a sensor
e) spectral emission from the melt pool
f) dimensions of the melt pool, such as area of the melt pool, length and/or width of the melt pool, a ratio of length to width, a rate of change of length to width of the melt pool (which may be used to determine if balling of the melt pool has occurred)
g) a comparison of images of adjacent layers
h) a gas pressure in the build chamber
i) oxygen concentration in the build chamber
j) pump speed of a pump for recirculating gas through the build chamber
k) elevator position, speed and/or acceleration
l) wiper position, speed and/or acceleration of the wiper
m) load on the wiper (acceleration and/or load on the wiper may be used to detect if parts of the consolidated area have curled up and project above the surface of a powder bed)
n) a predicted temperature of current or future portions of the workpiece/build from a thermal model based upon sensor signals
o) dosing of material
p) acoustic signals
q) images of a powder bed
r) images of the consolidated material, and/or
s) a rate of change of any one of (a) to (r).

There may be a one-to-one correlation between each acceptable process variation of the plurality of acceptable process variations and a state of progression of the build of the workpiece.

Alternatively, at least one of the acceptable process variations is associated with a plurality of states of progression of the build of the workpiece.

The plurality of acceptable process variations may only apply to portions of the workpiece, as specified by the associated state of progression of the build of the workpiece. For example, such portions may be portions of the workpiece with significant overhangs or thin walls. For other portions of the workpiece, there may be no acceptable process variations or a general acceptable process variation, for example used for the material or scanning strategy being used. In particular, a general acceptable process variation may be suitable for portions of a workpiece that are unlikely to fail or are not critical whereas workpiece specific acceptable process variations may be used for portions that are more likely to fail without bespoke control or are critical. In such an alternative embodiment, there may be a one-to-one correlation between each workpiece specific acceptable process variation and a state of progression of the build of the workpiece whereas there may be a one-to-many correlation between each general acceptable process variation and a state of progression of the build of the workpiece.

The sensor signals may comprise signals from one of more of the following sensors of the additive manufacturing apparatus:

a) Pyrometer, for example, for measuring the temperature of a material bed and/or a melt pool
b) Acoustic sensor, which may be used to derive attributes of various aspects of the process, as is described in GB1510220.5, incorporated herein by reference
c) Thermal (infra-red) camera, for example, for measuring the temperature of the material bed
d) Visible light camera, for example, for measuring deformations of the workpiece during the build
e) Photodiodes, for example, for measuring the temperature of a melt pool and/or a material bed
f) Spectrometer, for measuring spectral emissions form the melt pool and/or a plasma plume generated during melting of the material
g) Force feedback, for example, a load sensor on a wiper
h) Pressure sensor(s), for example for measuring gas pressure in a build chamber or a pressure difference across a filter element for filtering condensate from gas recirculated through the build chamber
i) Mass flow sensor, for example, for measuring a mass of gas recirculated through the build chamber
j) Oxygen sensor, for example, for measuring the oxygen concentration in the build chamber
k) Encoders, for example, for measuring the position, speed and/or accelerations/decelerations of a wiper for spreading a layer of material and/or an elevator
l) Accelerator, for example to measure accelerations/decelerations of the wiper The acceptable process variation may be a variation in a difference between two sensed values (rather than a variation in an absolute value). In this way, it may not be necessary to calibrate the sensors against an absolute value. For example, images of a material bed after spreading each layer may be compared and if a difference in the images for adjacent layers is outside an acceptable process variation, suitable action may be generated, such as halting the build, re-dosing and spreading of a layer, and/or generating an alert to inform the operator of a potential error in the build.

The time to complete a build, complete a layer and/or consolidate an area may itself be a variable for which there is an acceptable process variation. For example, if the time to complete a layer falls outside an acceptable process variation, this could cause failure in the processing of subsequent layers due to cooling of the build and the build may be halted.

A measure of a shape of the sensor signals about a mean, such as a measure of skewness or kurtosis, may be a variable for which there is an acceptable process variation. The acceptable process variation may comprise acceptable patterns of sensor signals for consecutive states of progression. For example, the acceptable process variation may relate to a pattern of sensor signals for a plurality of states of progression indicating that the sensor signals are beginning to diverge from an acceptable process variation. In particular, a pattern of increasing or decreasing sensor signals that differs significantly from a pattern of corresponding acceptable process variations may indicate the beginning of a divergence of the process from acceptable limits.

The method may comprise controlling the additive manufacturing apparatus during the build based upon the comparison of the sensor signals to the corresponding acceptable process variation.

The method may comprise controlling parameters of the build on the additive manufacturing apparatus to maintain the sensed signals within the corresponding acceptable process variation. The parameters may comprise one or more of power of an energy beam used to consolidate material, spot size of the energy beam on the material, scan speed of the energy beam across the material, point exposure time and point distance (for a pulsed scanning of the energy beam), hatch distance, hatch length and scanning strategy (such as meander, checkerboard, stripe and/or hull and core scanning strategies).

The method may comprise halting the build of the workpiece if the sensed signals fall outside of the acceptable process variation. Halting the build of the workpiece may comprise halting the entire build or, in the case that the workpiece is built together with other workpieces, suppressing the build of the workpiece whilst continuing with the build of the other workpieces.

The method may comprise re-datuming of the build/recalibration of the additive manufacturing apparatus if the sensed signals fall outside of the acceptable process variation.

The method may comprise machining the workpiece if the sensor signals fall outside of the acceptable process variation.

The additive manufacturing apparatus may comprise part of a machine chain and the method may comprise generating instructions for further machines of the machine chain if the sensed signals fall outside of the acceptable process variation.

The method may comprise only storing a subset of sensor data derived from the sensor signals based upon sensor signals that fall outside of the corresponding acceptable process variation. For example, the sensor data may be stored by exception with only sensor data that falls outside of the corresponding acceptable process variation and sensor signals within a window about that data, being stored.

The log may comprise location data, such as coordinate data or a state or progression of the build of the workpiece, from which can be determined a location of a suspect region of the workpiece, which, during formation, generated sensor signals that fell outside the corresponding acceptable process variation. The method may comprise using the location data to display, preferably in a 2- or 3-dimensional representation of the workpiece or build, suspect regions of the workpiece. In this way, the user can identify from the display suspect regions of the workpiece for further investigation and/or actions to correct defects, which may be taken in later stages of the manufacturing process.

The method may comprise controlling the additive manufacturing apparatus to repair a region of the workpiece based on sensor signals for that region falling outside the corresponding acceptable process variation. For example, the repair may comprise reconsolidating the region with an energy beam/plasma jet.

The method may comprise controlling the additive manufacturing apparatus to carry out a further inspection of a region of the workpiece based on sensor signals for that region falling outside the corresponding acceptable process variation. The inspection may comprise probing the region, for example with an energy beam, such as an energy beam used to consolidate material or a further energy beam. The energy density of the energy beam used for inspection may be below that required to consolidate the material. The inspection may comprise heating of the region with a heat source that can selectively heat regions of the workpiece and monitoring the thermal characteristics of the region with a sensor, such as a pyrometer or thermal camera.

According to a second aspect of the invention there is provided a controller for monitoring an additive manufacturing apparatus, the controller comprising a processor arranged to receive one or more sensor signals from the additive manufacturing apparatus during a build of a workpiece, compare the one or more sensor signals to a corresponding acceptable process variation of a plurality of acceptable process variations and generate a log based upon the comparisons, wherein each acceptable process variation of the plurality of acceptable process variations is associated with a state of progression of the build of the workpiece and the corresponding acceptable process variation is the acceptable process variation associated with the state of progression of the build when the one or more sensor signals are generated.

The controller may be arranged to receive the plurality of acceptable process variations, optionally together with the build instructions for building the workpiece. The controller may comprise memory and the processor arranged to store the plurality of acceptable process variations in memory on receiving the build instructions. The plurality of acceptable process variations may be erased from memory after completion of the build of the workpiece or when build instructions for a different workpiece are uploaded to the controller. As the plurality of acceptable process variations are specific to the build of the workpiece, the plurality of acceptable process variations may be contained in the same file as the instructions for carrying out the build and uploaded to the controller together. As the plurality of acceptable process variations are build/workpiece specific, once the controller is used for a different build/workpiece, the plurality of acceptable process variations are redundant and can be erased.

The controller may be arranged to only store a subset of sensor data derived from the sensor signals based upon the sensor signals that fall outside the corresponding acceptable process variation.

According to a third aspect of the invention there is provided an additive manufacturing apparatus comprising a controller according to the second aspect of the invention.

According to a fourth aspect of the invention there is provided a data carrier having instructions therein, which, when executed by a processor, cause the processor to carry out the method of the first aspect of the invention.

According to a fifth aspect of the invention there is provided a method of generating instructions for the building of a workpiece in an additive manufacturing apparatus, the method comprising building one or more initial workpieces nominally identical to at least a portion of the workpiece with the and/or one or more corresponding additive manufacturing apparatus, receiving a set of sensor signals from the and/or the one or more corresponding additive manufacturing apparatus during the build of the or each initial workpiece, evaluating the one or more initial workpieces to determine if the or each initial workpiece meets specified requirements and associating the or each set of sensor signals with one or more quality identifiers identifying whether all or a portion of the sensor signals of the set represent sensor signals for a build that meets the specified requirements and determining, from the one or more sets of sensor signals and associated quality identifiers, a plurality of acceptable process variations for a corresponding set of sensor signals generated during a subsequent build of the workpiece using the additive manufacturing apparatus.

The acceptable process variation may be determined by a statistical analysis of the natural process variation in the sensor signals during the build of the one or more initial workpieces and whether the sensor signals relate to a portion of the workpiece evaluated as meeting the specified requirements (so called, "golden sensing data", which is used as a benchmark or fingerprint against which future builds are judged). The acceptable process variation may have been derived from sensor signals generated by the and/or the one or more corresponding additive manufacturing apparatus during one or more initial builds identical to the build of the workpiece.

The statistical analysis may comprise Bayesian modelling and/or cluster analysis.

As the sensor data is generated from the build of identical workpiece(s) and, optionally, identical build(s), the sensor data is controlled for variations that can arise from different geometries and, optionally, different builds. For example, a temperature of a region being consolidated (e.g. a melt pool) can vary dependent on a geometry of the workpiece/setup of the build even if the same scan strategy is used across the area to be consolidated. Furthermore, the time between the consolidations of consecutive layers can affect the cooling that occurs between the formation of the layers and therefore, the thermal characteristics of the build. The time between the consolidations of consecutive layers will be dependent on a size of an area to be consolidated in each layer, so called "loading" of a layer. The loading of a layer will depend on, among other things, a geometry of the workpiece being built, the number of workpieces to be built in a single build and the orientation in which the workpieces are built. Accordingly, deriving an acceptable process variation for the build of a workpiece from sensor signals generated by the and/or the corresponding additive manufacturing apparatus during the one or more builds of the initial workpieces ensures an influence of the geometry of the workpiece and, optionally, the build setup, on the sensor data is taken into account. Such a method may be particularly appropriate for the manufacture of a series of identical workpieces and/or builds using the and/or the one or more corresponding additive manufacturing apparatus.

In the manufacture of a series of nominally identical workpieces, the acceptable process variation may be refined/evolved with the sensor data from each build as more of the workpieces are built.

The initial workpieces may be built in a position within a build volume identical to the position in which the workpiece is subsequently built. Changes in a position of a workpiece in the build volume may affect the parameters required to achieve a workpiece meeting the specified requirements such that acceptable process variations determined for one position of the workpiece in the build volume may not apply to another position of the workpiece in the build volume. For example, differences in the gas flow at different locations across a build surface may require different parameters to be used for building the workpiece at different positions in the build volume.

In an alternative embodiment, the initial workpieces may be built in a position within a build volume different to the position in which the workpiece is subsequently built. For example, a mapping may be used to transform the acceptable process variations determined for one position of the workpiece in the build volume to acceptable process variations for another position of the workpiece in the build volume. The mapping may be determined from an appropriate mapping routine, such as through the building of test blocks/elements at different positions throughout the build volume and comparing differences in the sensor signals for the test blocks/elements at different positions within the build volume.

In the case where the workpiece is one of a set of (identical or non-identical) workpieces to be built together in a single build, the initial workpieces may also be built together with an identical set of workpieces in an identical layout in a build volume to that used when building the workpiece. In this way, an identical loading is achieved in the build(s) of the initial workpiece(s) to that of the subsequently built workpiece.

In an alternative embodiment, where the workpiece is one of a set of (identical or non-identical) workpieces to be built together in a single build in a first build layout, the initial workpiece(s) may be built in a second, different build layout in a build volume and a mapping is used to transform the acceptable process variations determined from the sensor data of the initial workpiece in a second build layout into acceptable process variations for a build of the workpiece in the first build layout. For example, a mapping may be used to transform the acceptable process variations determined from the sensor data of the initial workpiece in the second build layout into acceptable process variations for a build of the workpiece in the first build layout. The mapping may be determined from an appropriate mapping routine, such as through the building of a series of builds, for example of test blocks/elements, with different loadings and comparing differences in the sensor signals for the builds having different loadings.

The method may comprise generation of map to be used to transform acceptable process variations determined for a first additive manufacturing apparatus to a set of acceptable process variations to be used for a corresponding second additive manufacturing apparatus. In particular, the response of the sensors in the first additive manufacturing apparatus may differ to the response of the sensors in the second additive manufacturing apparatus. Accordingly, the map may transform the acceptable process variations to take account of differences in the response of the sensors in the two apparatus. The mapping may be determined by building identical test blocks in each additive manufacturing apparatus and identifying differences in the sensor performance.

The corresponding additive manufacturing apparatus have nominally identical functionality to the additive manufacturing apparatus. For example, the corresponding additive manufacturing apparatus may be the same make and model as the additive manufacturing apparatus or additive manufacturing apparatus that can be configured to run in a common functional setup to the additive manufacturing apparatus, such as with nominally identical scan parameters, spot size, point distance, exposure time, laser power, etc, and nominally identical gas flow, wiper speed and z-platform speed with comparable sensors for generating the sensor signals such that a like-for-like comparison can be made between builds on different ones of the additive manufacturing apparatus. The nominally identical additive manufacturing apparatus may have or may be configurable to have nominally identical signal timing and/or processing delays. Of course the additive manufacturing apparatus may be different in ways that do not significantly affect the build, such as colour, shape of an outer casing and, possibly, the provision of different elements that still result in a nominally identical functional performance, such as different filter elements and/or pumps. The corresponding additive manufacturing apparatus may comprise additive manufacturing apparatus that have been configured to emulate the functionality of the additive manufacturing apparatus.

The specified requirement for a build of the initial workpieces may be completion of the build of the workpiece, a density of the consolidated material, an absence or a maximum number or size of cracks, voids or inclusions in the workpiece, surface finish, porosity, a crystal structure (including grain size and morphology) and/or a chemical composition of the workpiece. The specified requirement may be a specified compressive strength, tensile strength, shear strength, hardness, micro-hardness, bulk modulus, shear modulus, elastic modulus, stiffness, elongation at fracture, Poisson's ratio, corrosion resistance, dissipation factor, conductivity and/or magnetic properties of the workpiece. The specified requirement may be a specified performance when carrying out functional testing. Where only a region of the initial workpiece is deemed to meet the specified requirements, the user may identify whether all sensor signals for the build of that initial workpiece are identified as relating to a build that fails to meet the specified requirements or whether only the sensor signals associated with the region deemed to not meet the specified requirements should be identified as such with the other sensor data relating to an acceptable build. For example, in the former case, the user may deem the failure to be a systematic error affecting large regions/all of the build. In the latter case, the user may identify that the failure is a local failure that did not significantly influence the sensor signals collected for remote regions of the workpiece.

Analysis of the workpiece to determine if the workpiece meets the specified requirements may comprise non-destructive testing (NDT), such as dimensional testing, for example using contact sensing, such as touch trigger or scanning probes, or using contactless sensing, such as optical probing, and/or a CT or ultrasound scan, for example to determine whether the workpiece includes cracks or inclusions. Analysis of the workpiece to determine if the workpiece meets the specified requirements may comprise destructive testing, such as physical sectioning and examination, for example with a microscope, and/or proof testing. Analysis of the workpiece to determine of the workpiece meets the specified requirements may comprise density measurements, such as Archimedes' testing. Analysis of the workpiece may comprise analysis of values obtained by in-process testing/inspection. For example, the additive manufacturing process may include layer-by-layer inspection, such as spatially resolved acoustic spectroscopy (SRAS).

The method may comprise determining a set of primary acceptable process variations from the one or more sets of sensor signals and associated quality identifiers, each primary acceptable process variation associated with a state of progression of the build of the workpiece, generating a reduced set of secondary acceptable process variations from the set of primary acceptable variations, at least one of the secondary acceptable process variations associated with a plurality of states of progression of the build of the workpiece. The reduced set of secondary acceptable process variations may be generated by grouping together similar ones of the primary acceptable process variations and generating one of the secondary acceptable process variations for each group, each secondary acceptable process variation associated with a plurality of states of progression corresponding to the states of progression associated with the primary acceptable process variations of the corresponding group for which the secondary acceptable process variation is generated.

In certain circumstances, a complete set of acceptable process variations for every state of progression of the build (such as every exposure point) may result in an extremely large file. Accordingly, there are advantages to reducing the set of primary acceptable process variations to a smaller manageable set of secondary acceptable process variations that still captures the key characteristics of the set of primary acceptable process variations. In particular, the acceptable process variations for adjacent states of progression of the build may be sufficiently similar not to warrant keeping separate primary acceptable process variations for both states.

Accordingly, each secondary acceptable process variation may be generated from characteristics of the primary acceptable process variations of the corresponding group for which the secondary acceptable process variation is generated.

The primary acceptable process variations may be grouped using values derived from a similarity function.

The method may comprise receiving a user input identifying different regions of the workpiece for which different similarity criteria are used for grouping the primary acceptable process variations together. In particular, some regions of the build may be identified as problematic and therefore, the user may deem it useful to use acceptable process variations with a higher resolution of differentiation for these problematic regions than for regions of the build that are less problematic. By allowing the user to identify regions for which different similarity criteria are applied, the method allows the user to adjust the level of generalisation provided to the acceptable process variations based upon prior knowledge of the build and the workpiece requirements.

According to sixth aspect of the invention there is provided a system for generating instructions for controlling an additive manufacturing apparatus, the system comprising a processor arranged to receive a set of sensor signals for each build of one or more initial workpieces, nominally identical to at least a portion of the workpiece, with the and/or one or more corresponding additive manufacturing apparatus, receive an indication of whether the or each initial workpiece meets specified requirements, associate the or each set of sensor signals with one or more quality identifiers identifying whether all or a portion of the sensor signals of the set represent sensor signals for a build that meets the specified requirements and determine, from the one or more sets of sensor signals and associated quality identifiers, a plurality of acceptable process variations for a corresponding set of sensor signals generated during a subsequent build of the workpiece using the additive manufacturing apparatus.

The processor may be arranged to associate each acceptable process variation with a state of progression of the build. The state of progression may be a position within the build volume, a time during the build and/or an order in which the sensor signals are collected during the build.

The processor may be arranged to generate a build file comprising scan paths and scan parameters for an energy beam or plasma jet to follow when consolidating material in the formation of the workpiece in a layer-by-layer manner and the plurality of acceptable process variations.

The processor may be arranged to determine a set of primary acceptable process variations from the one or more sets of sensor signals and associated quality identifiers, each primary acceptable process variation associated with a state of progression of the build of the workpiece and generate a reduced set of secondary acceptable process variations from the set of primary acceptable variations, at least one of the secondary acceptable process variations associated with a plurality of states of progression of the build of the workpiece.

The reduced set of secondary acceptable process variations may be generated by grouping together similar ones of the primary acceptable process variations and generating one of the secondary acceptable process variations for each group, each secondary acceptable process variation associated with a plurality of states of progression corresponding to the states of progression associated with the primary acceptable process variations of the corresponding group for which the secondary acceptable process variation is generated.

Each secondary acceptable process variation may be generated from characteristics of the primary acceptable process variations of the corresponding group for which the secondary acceptable process variation is generated.

The primary acceptable process variations may be grouped using values derived from a similarity function.

The processor may be arranged to receive a user input identifying a region of the workpiece and group the primary acceptable process variations associated with the identified region using a different similarity criteria to that used to group primary acceptable process variations associated with other regions of the workpiece.

According to a seventh aspect of the invention there is provided a data carrier having instructions thereon, which, when executed by a processor, cause the processor to perform in accordance with the sixth aspect of the invention.

According to an eighth aspect of the invention there is provided a method of controlling an additive manufacturing apparatus comprising providing instructions for building a workpiece by consolidating material in a layer-by-layer manner using the additive manufacturing apparatus and determining a plurality of acceptable process variations for sensor signals of the additive manufacturing apparatus and generating a build file comprising the instructions and the plurality of acceptable process variations.

Each of the acceptable process variations may be associated with at least one state of progression of the build of the workpiece.

According to an ninth aspect of the invention there is provided apparatus comprising a processor, the processor arranged to carry out the method of the eighth aspect of the invention.

According to a tenth aspect of the invention there is provided a data carrier having instructions stored thereon, which, when executed by a processor, cause the processor to carry out the method of the eighth aspect of the invention.

According to an eleventh aspect of the invention there is provided a data carrier having thereon a build file for instructing an additive manufacturing apparatus in the building of a workpiece in a layer-by-layer manner, the build file comprising instructions for how the additive manufacturing apparatus is to build the workpiece and acceptable process variations for sensor signals generated by sensors of the additive manufacturing apparatus during the building of the workpiece.

As the acceptable process variations are particular to the workpiece to be built, storing the acceptable process variations in the build file together with the instructions for building the workpiece ensures that both are transmitted to the additive manufacturing apparatus when the build file is uploaded.

According to a twelfth aspect of the invention there is provided a method of monitoring an additive manufacturing apparatus comprising capturing a plurality of thermal images of a material layer as the material is consolidated and determining a rate of change in temperature of consolidated areas from a comparison of the plurality of thermal images and storing a record of the rate of change of temperature of the consolidated areas.

A rate of change of temperature may be recorded for a plurality of regions of the material layer. A two-dimensional map of the rate of change of temperature may be stored for each layer. The method may comprise displaying the two-dimensional map to a user.

Calibration of a thermal camera to determine a rate of change of temperature may be less difficult than calibrating a thermal camera to determine absolute temperatures. However, it is believed knowing the rate of change of temperature, without knowing absolute temperature, provides useful feedback in an additive manufacturing apparatus. For example, thermal stresses developed in the workpiece during the build may be related to the thermal gradient across consolidated material rather than an absolute temperature. The rate of change of temperature may be determined from a difference in the intensity of pixels in the plurality of images corresponding to a common location on a layer.

According to a thirteenth aspect of the invention there is provided an additive manufacturing apparatus comprising a support, a material source for providing material to the support and a radiation source for consolidating layers of the material to form a workpiece in a layer-by-layer manner, a thermal camera for imaging the material as the material is consolidated and a processor arranged to receive images from the thermal camera, compare a plurality of images of consolidated material to determine a rate of change of temperature of the consolidated material.

According to an fourteenth aspect of the invention there is provided a data carrier having instructions therein, which, when executed by a processor, cause the processor to carry out the method of the ninth aspect of the invention.

According to a fifteenth aspect of the invention there is provided a method of monitoring an additive manufacturing apparatus comprising capturing images of consecutive layers of material, determining a difference in the images between corresponding regions of the consecutive layers for a plurality of corresponding regions, determining from the differences a dissimilarity value quantifying an overall difference in the images for the plurality of corresponding regions and controlling the additive manufacturing apparatus based upon whether the dissimilarity value is above or below a threshold value.

In this way, an overall measure is provided for identifying whether a build event has occurred that is outside of the expected process variation and the additive manufacturing apparatus is controlled accordingly. For example, the additive manufacturing apparatus may initially attempt an automated fix to the problem, such as re-dosing of a powder layer. In the event that the automatic fix fails to bring a discrepancy in the images for consecutive layers to below the threshold value (e.g. within an expected process variation), the additive manufacturing apparatus may flag to the user/operator that a discrepancy has occurred.

The images may be of consecutive layers of material before consolidation with an energy beam/plasma jet. The threshold value may be set based upon expected dissimilarity values identified for two consecutive material layers that have been formed correctly (e.g. with a sufficient coverage of material) and do not have consolidated parts projecting therethrough. The threshold value may be determined from a statistical analysis (natural variation) of the dissimilarity values generated for such correctly formed consecutive layers, the threshold value set above the statistically determined natural variation.

The corresponding regions may be corresponding individual or groups of pixels of the images. The dissimilarity value may be determined from the differences between corresponding regions, wherein greater differences are weighted to disproportionately contribute to the dissimilarity value compared to the magnitude of the difference. In this way, the dissimilarity value will be significantly affected by large differences between a few corresponding regions compared to small differences between many corresponding regions.

According to a sixteenth aspect of the invention there is provided an additive manufacturing apparatus comprising a support, a material source for providing material to the support and a radiation source for consolidating layers of the material to form a workpiece in a layer-by-layer manner, a camera for imaging consecutive layers of the material and a processor arranged to determine a difference in the images between corresponding regions of the consecutive layers for a plurality of corresponding regions, determine from the differences a dissimilarity value quantifying an overall difference in the images for the plurality of corresponding regions and control the additive manufacturing apparatus based upon whether the dissimilarity value is above or below a threshold value.

According to a seventeenth aspect of the invention there is provided a data carrier having instructions therein, which, when executed by a processor, cause the processor to carry out the method of the fifteenth aspect of the invention.

According to an eighteenth aspect of the invention there is provided a method of monitoring an additive manufacturing apparatus comprising capturing an image of a layer of material that has been spread by a wiper but before consolidation of the layer with an energy beam, determining a dissimilarity value quantifying a difference between different columns of the image and controlling the additive manufacturing apparatus to change/adjust the wiper and/or generate an alert for a user to check the wiper based upon whether the dissimilarity value is above or below a threshold value.

According to a nineteenth aspect of the invention there is provided an additive manufacturing apparatus comprising a support for supporting a material bed, a material source for providing material, a wiper for spreading material provided by the material source across the material bed and a radiation source for generating an energy beam for consolidating layers of the material to form a workpiece in a layer-by-layer manner, a camera for capturing images of each layer before consolidation of the layer with the energy beam, and a processor arranged to determine, for each image, a dissimilarity value quantifying a difference between different columns of the image and control the additive manufacturing apparatus to change/adjust the wiper and/or generate an alert for a user to check the wiper based upon whether the dissimilarity value is above or below a threshold value.

According to a twentieth aspect of the invention there is provided a data carrier having instructions therein, which, when executed by a processor, cause the processor to carry out the method of the eighteenth aspect of the invention.

According to a twenty-first aspect of the invention there is provided a method of monitoring an additive manufacturing process in which a workpiece is built by consolidating material in a layer-by-layer manner, the method comprising receiving sensor signals from the additive manufacturing apparatus during a build of a workpiece, identifying from the sensor signals a region of the workpiece for further inspection and manoeuvring a sensor system to capture further sensor data from the identified region.

The sensor system may comprise an optical sensor system for capturing radiation generated by the region. The optical system may comprise steerable optics for capturing radiation emitted from a selected locality on the workpiece. The method may comprise controlling the steerable optics for capturing radiation from the identified region. Alternatively, the optical system may be mounted on a gantry system for directing the optical system to capture radiation emitted from a selected locality on the workpiece. The method may comprise manoeuvring the optical system on the gantry system to capture further sensor data form the identified region.

The optical system may share optical components with an optical system for directing a laser beam for consolidating the material, wherein the optical system is directed to capture further data on a region in between consolidation of material with the laser beam. For example, the optical system may be directed to capture radiation from the identified region during forming of a layer with a wiper and/or moving of a platform supporting a material bed. Alternatively, a predetermined movement of the optical system for consolidating material may be modified if a region is identified for further inspection to enable further data to be captured on the region during a period in which material is consolidated. During the capture of further sensor data on the region, the laser beam used for consolidating material may be turned off, reduced power or defocussed such that reconsolidation of the identified region is avoided during capture of the further sensor data. Use of the laser beam at a lower energy density that is below that required to consolidate material may be useful as a laser probe to stimulate emission of radiation from the identified region.

Alternatively, the optical system may comprise an optical system separate from the system for steering an energy beam that is used to consolidate material.

A region may be identified for further inspection if the sensor signals fall outside of an acceptable process variation.

According to a twenty-second aspect of the invention there is provided a controller for controlling an additive manufacturing apparatus, the controller comprising a processor arranged to receive sensor signals from the additive manufacturing apparatus during a build of a workpiece, identify from the sensor signals a region of the workpiece for further inspection and generate instructions for manoeuvring a sensor system to capture further sensor data from the identified region.

According to a twenty-third aspect of the invention there is provided an additive manufacturing apparatus comprising a controller according to the twenty-second aspect of the invention.

According to a twenty-fourth aspect of the invention there is provided a data carrier having instructions therein, which, when executed by a processor, cause the processor to carry out the method of the twenty-second aspect of the invention.

According to a twenty-fifth aspect of the invention there is provided a method of generating instructions for the building of a workpiece in an additive manufacturing apparatus, the method comprising receiving a set of primary acceptable process variations for sensor signals generated during a build of the workpiece using the additive manufacturing apparatus, each primary acceptable process variation applicable to sensor signals generated during a particular state of progression of the build of the workpiece associated with that primary acceptable process variation, and generating a reduced set of secondary acceptable process variations from the set of primary acceptable variations, at least one of the secondary acceptable process variations associated with a plurality of states of progression of the build of the workpiece.

The reduced set of secondary acceptable process variations may be generated by grouping together similar ones of the primary acceptable process variations and generating one of the secondary acceptable process variations for each group, each secondary acceptable process variation associated with a plurality of states of progression corresponding to the states of progression associated with the primary acceptable process variations of the corresponding group for which the secondary acceptable process variation is generated.

Each secondary acceptable process variation may be generated from characteristics of the primary acceptable process variations of the corresponding group for which the secondary acceptable process variation is generated.

The primary acceptable process variations may be grouped using values derived from a similarity function.

The processor may be arranged to receive a user input identifying different regions of the workpiece for which different similarity criteria are used for grouping the primary acceptable process variations together.

According to a twenty-sixth aspect of the invention there is provided a controller comprising a processor arranged to carry out the method of the twenty-fifth aspect of the invention.

According to a twenty-seventh aspect of the invention there is provided a data carrier having instructions therein, which, when executed by a processor, cause the processor to carry out the method of the twenty-fifth aspect of the invention.

According to a twenty-eighth aspect of the invention there is provided a method for generating instructions for machines of a manufacturing chain used to manufacture a workpiece, the manufacturing chain including an additive manufacturing apparatus, the method comprising receiving sensor signals from the additive manufacturing apparatus during the build of a workpiece and generating instructions for at least one further machine of the manufacturing chain based upon the sensor signals.

The method may comprise comparing the sensor signals to acceptable process variations in the sensor signals and instructions for at least one further machine of the manufacturing chain are generated based upon the comparison.

The further machine may comprises a subtractive manufacturing machine, a polishing machine, a support removal machine, a measuring machine, a further additive manufacturing machine, a machine for relieving thermal stresses in the workpiece, and/or a machine for reconditioning a build substrate.

According to a twenty-ninth aspect of the invention there is provided apparatus for generating instructions for machines of a manufacturing chain used to manufacture a workpiece, the apparatus comprising a processor arranged to carry out the method of the twenty-eight aspect of the invention.

According to thirtieth aspect of the invention there is provided a data carrier having machine-readable instructions stored thereon, wherein the machine-readable instructions, when executed by a processor, cause the processor to carry out the method of the twenty-eight aspect of the invention.

According to a thirty-first aspect of the invention there is provided a method of manufacturing a workpiece comprising using an additive manufacturing apparatus, in which the workpiece is formed by consolidating material in a layer-by-layer manner, the method comprising receiving sensor signals from a sensor of the additive manufacturing apparatus during a build of the workpiece and displaying a representation of each sensor signal together with a corresponding acceptable process deviation for signals from that sensor for the state for progression of the build at the time the sensor signal is captured, wherein different ones of the states of progression are associated with different acceptable process variations.

According to a thirty-second aspect of the invention there is provided a visualisation apparatus to be used in a manufacturing process, the visualisation apparatus comprising a processor and a display, wherein the processor is arranged to carry out the method of the thirty-first aspect of the invention to cause the display to display the representation.

According to a thirty-third aspect of the invention there is provided a data carrier having instructions therein, which, when executed by a processor, cause the processor to carry out the method of the thirty-first aspect of the invention.

According to a thirty-fourth aspect of the invention there is provided a method of manufacturing a plurality of nominally identical workpieces using one or more additive manufacturing apparatus, in which each workpiece is formed by consolidating material in a layer-by-layer manner, the method comprising receiving sensor signals from a sensor of the or each additive manufacturing apparatus during a build of the workpieces, determining a plurality of acceptable process variations from the sensor signals for different states of progression of the build and displaying a representation of each sensor value for at least one of the workpieces together with a corresponding acceptable process deviation of the plurality of acceptable process variations for the state for progression of the build at the time the sensor signal is captured.

According to a thirty-fifth aspect of the invention there is provided a visualisation apparatus to be used in a manufacturing process, the visualisation apparatus comprising a processor and a display, wherein the processor is arranged to carry out the method of the thirty-fourth aspect of the invention to cause the display to display the representation.

According to a thirty-sixth aspect of the invention there is provided a data carrier having instructions therein, which, when executed by a processor, cause the processor to carry out the method of the thirty-fourth aspect of the invention.

The data carrier may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a w % ire or fibre optic or a wireless signal, for example a signals sent over a wired or wireless network (such as an Internet download, an FTP transfer, or the like).

DESCRIPTION OF EMBODIMENTS

Figure 1:
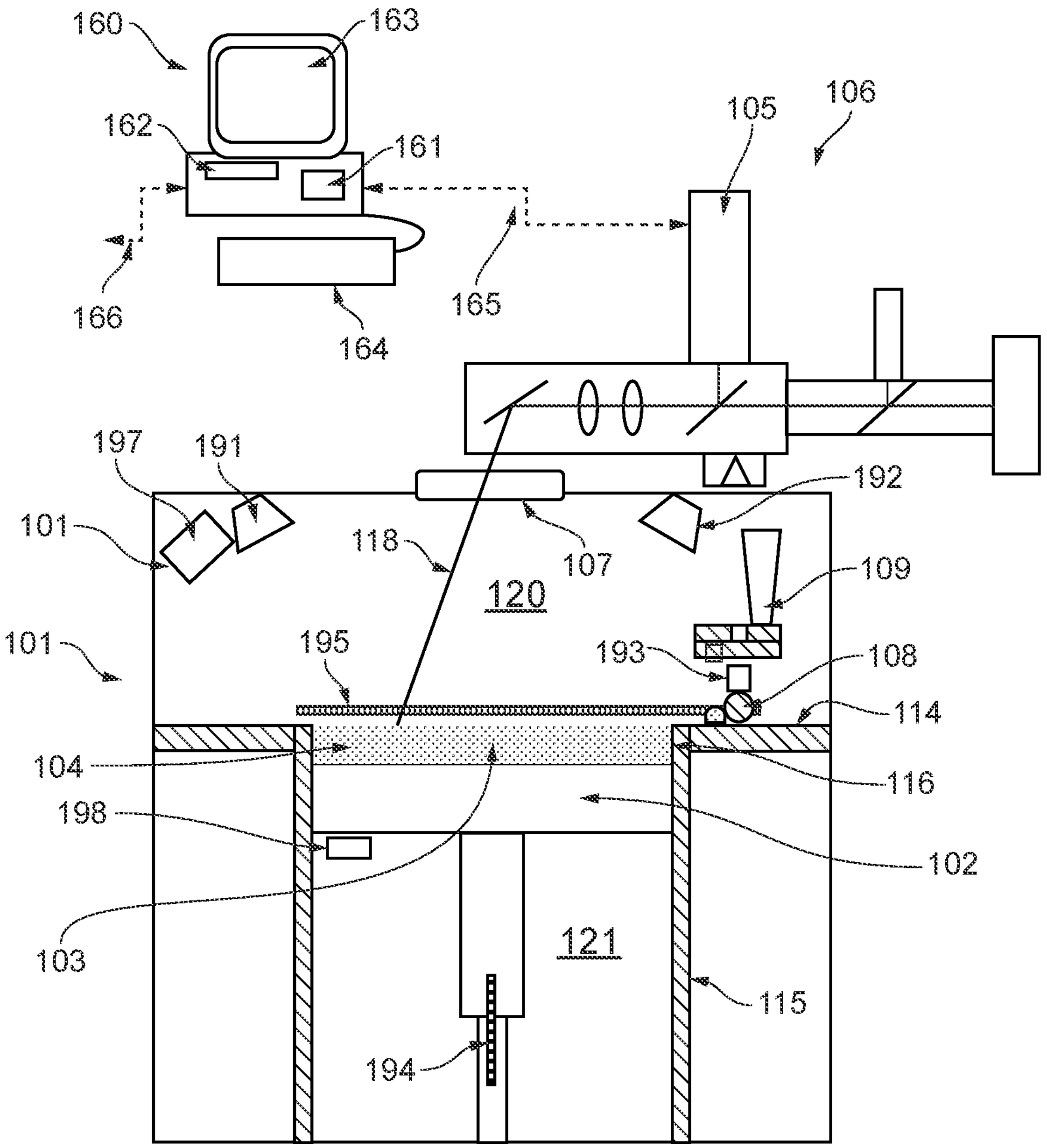
FIG. 1 is a schematic representation of a selective laser melting (SLM) apparatus according to the invention.

Referring to FIG. 1, a selective laser melting (SLM) apparatus according to an embodiment of the invention comprises a build chamber 101 having therein partitions 114, 115 that define a build volume 116 and a surface onto which powder can be deposited. A build platform 102 defines a working area in which a workpiece 103 is built by selective laser melting powder 104. The platform 102 can be lowered within the build volume 116 using elevator mechanism 117 as successive layers of the workpiece 103 are formed. A build volume available is defined by the extent to which the build platform 102 can be lowered into the build volume 116. The build platform 102 divides the build chamber 101 into an upper chamber 120 and a lower chamber 121 in accordance with the concept disclosed in WO2010/007394.

Layers of powder 104 are formed as the workpiece 103 is built by dispensing apparatus 109 and a wiper 108. For example, the dispensing apparatus may be apparatus as described in WO2010/007396. The wiper 108 is mounted to allow upwards movement of the wiper 108 against biasing of a biasing member (not shown) and a load sensor 193 is provided for detecting vertical deflections of the wiper 108. Such vertical deflections of the wiper 108 may be caused by consolidated portions of the build projecting from the bed, for example as a result of curl or deformation caused by the thermal stresses during the build. The load sensor 193 provides feedback on the existence of these projections as the wiper 108 rides over the projections.

Encoders 194, 195 are used for measuring the positions of the build platform 102 and the wiper 108. The position information is fed back to computer 160.

A laser module 105 generates a laser for melting the powder 104, the laser directed onto the powder bed 104 as required by optical module 106 under the control of a computer 160. The laser enters the chamber 101 via a window 107.

Computer 160 comprises a processor unit 161, memory 162, display 163, user input device 164, such as a keyboard, touch screen, etc, a data connection to modules of the laser melting apparatus, such as optical module 106, laser module 105 and motors (not shown) that drive movement of the dispensing apparatus 109, wiper 108 and build platform 102. An external data connection 166 provides for the uploading of a build file to the computer 160. The laser unit 105, optical unit 106 and movement of build platform 102 are controlled by the computer 160 based upon scanning instructions contained in the build file.

Figure 2:
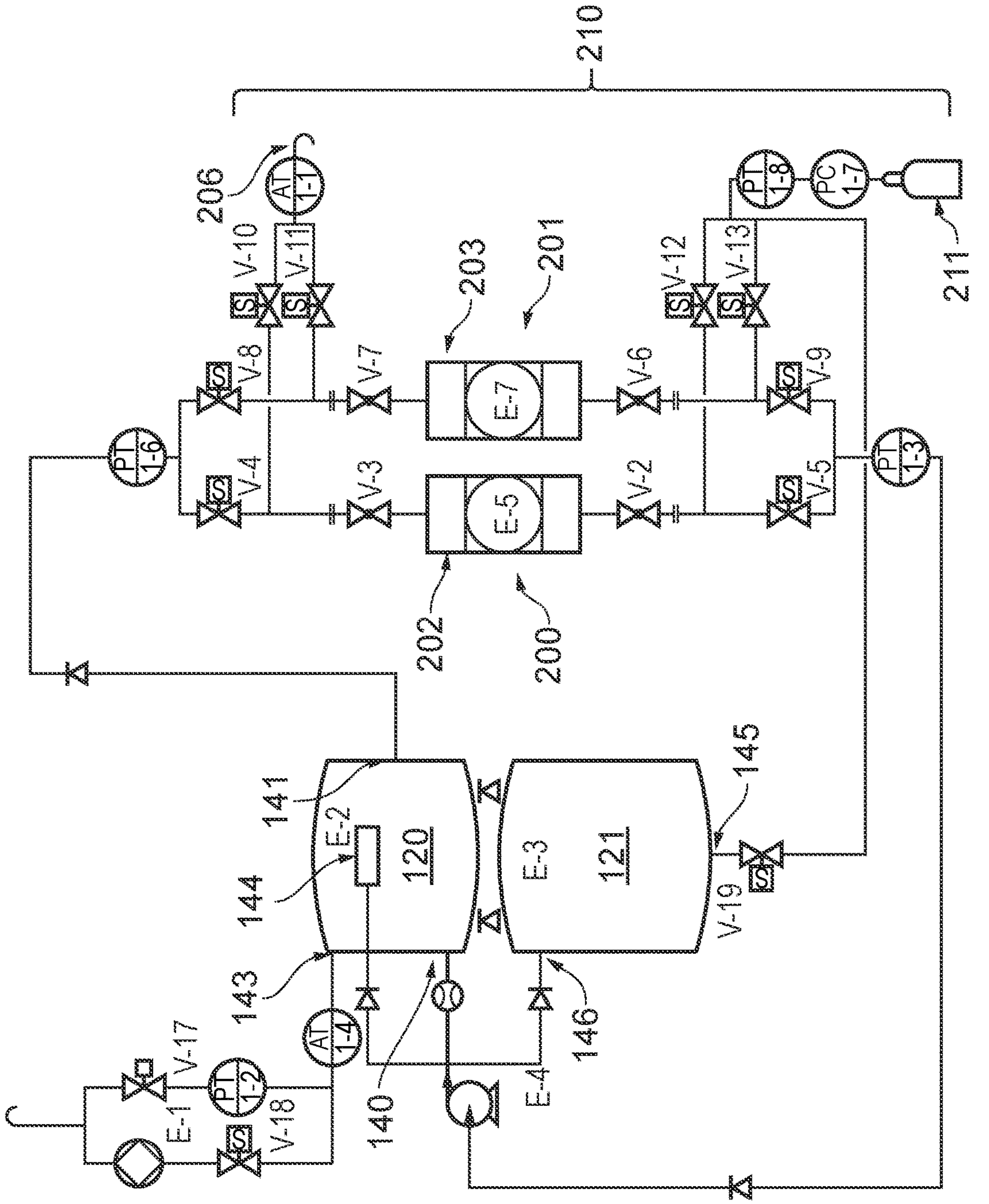
FIG. 2 is a schematic representation of a gas recirculation circuit of the selective laser melting apparatus.

Referring to FIG. 2, the apparatus comprises a gas nozzle 140 and a gas exhaust 141 for generating a gas flow through the upper chamber 120 across the build platform 102. The gas flow acts as a gas knife carrying condensate created by the melting of the powder with the laser away from the build area. The apparatus comprises a further gas nozzle 144 for generating a gas flow across the window 107. This gas flow may prevent condensate from collecting on the window 107, which in turn could affect the quality of the laser beam 118 delivered through the window 107.

A vent 143 provides a means for venting/removing gas from the chambers 120, 121. A backfill inlet 145 provides an inlet for backfilling the chambers 120, 121 with inert gas. The lower chamber 121 may comprise a further inlet 146 for maintaining the lower chamber 121 at an overpressure relative to the upper chamber 120.

The gas flow circuit comprises filter assemblies 200, 201 connected in parallel within the gas circuit to filter particulates within the recirculated gas. Each filter assembly 200, 201 comprises a filter housing 202, 203, a filter element E-5, E-7 located in the filter housing 202, 203 and manually operated valves V-2, V-3, V6, V-7 for opening and closing gas inlet and gas outlet, respectively. Each filter assembly 200, 201 is detachable from the gas circuit for replacement of the filter, as is described in WO2010/026396 (see FIG. 4*b*).

Pump E-4 generates the gas flow though the gas circuit. Gas exiting pump E-4 passes to gas nozzles 140, 144 to produce gas knives across the build surface and the window 107. The pump may also deliver the gas to the inlet 146 in the lower chamber 121 for maintaining the lower chamber 121 at an overpressure relative to the upper chamber 120. Exhaust 141 is connected to the filter assemblies 200, 201 via pressure transducer I-5 to complete the gas circuit.

The backfill inlet 145 is connected to the source of inert gas 211 and the flow of inert gas to the backfill inlet is controlled by solenoid valve V-19.

Vent 143 is connected to solenoid valve V-18 and vacuum pump E-1, which provide means for creating a low pressure or vacuum in the upper and lower chambers 120, 121. An oxygen sensor I-4 detects the amount of oxygen present in the gas exiting from the chambers 120, 121 via vent 143. Vent 143 is also connected to a pressure transducer I-2 and vent valve V-17. Pressure transducer I-2 measures the pressure of gas at the vent 143 and the vent valve V-17 is opened if excessive pressure is measured by pressure transducer I-2. Typically, the upper chamber 120 is maintained at a slight overpressure relative to atmospheric pressure.

Figure 3:
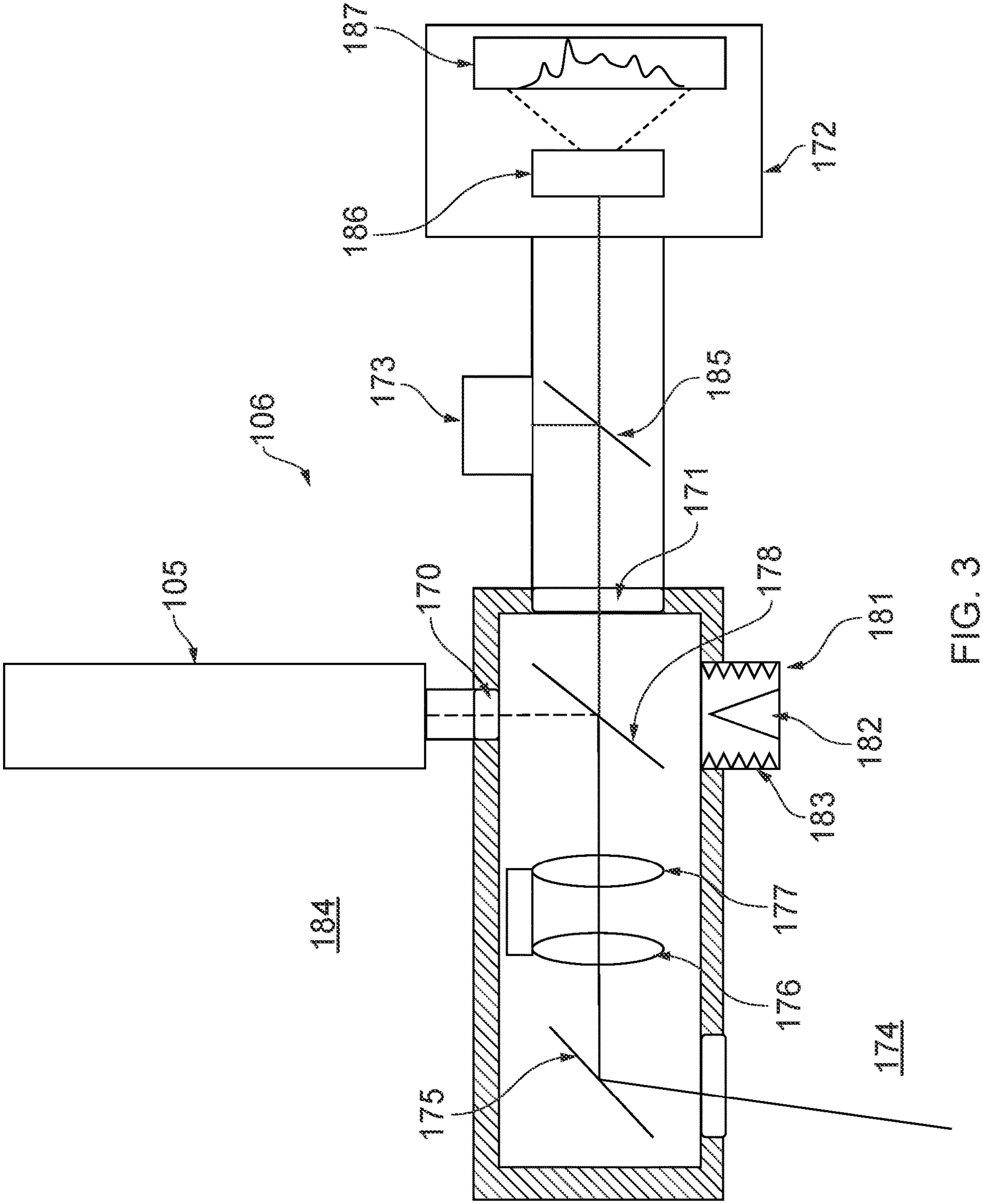
FIG. 3 is a schematic representation of the optical unit of the selective laser melting apparatus.

FIG. 3 shows the optical module 106 in detail. The optical module comprises a laser aperture 170 for coupling to the laser module 105, a measurement aperture 171 for coupling to measurement devices 172, 173 and output aperture 174 through which the laser beam is directed through window 107 on to the powder bed 104 and radiation emitted from the powder bed is collected.

The laser beam is steering and focused to the required location on the powder bed 104 by scanning optics comprising two tiltable mirrors 175 (only one of which is shown) and focusing lenses 176, 177.

The tiltable mirrors 175 are each mounted for rotation about an axis under the control of an actuator, such as galvanometer. The axes about which the mirrors 175 are rotated are substantially perpendicular such that one mirror can deflect the laser beam in one direction (X-direction) and the other mirror can deflect the laser beam in a perpendicular direction (Y-direction). However, it will be understood that other arrangements could be used, such as a single mirror rotatable about two axes and/or the laser beam could be coupled, for example via an optical fibre, into a mirror mounted for linear movement in the X- and Y-directions. Examples of this latter arrangement are disclosed in US2004/0094728 and US2013/0112672.

In order to ensure that a focus of the laser beam is maintained in the same plane for changes in a deflection angle of the laser beam it is known to provide an f-θ lens after tiltable mirrors. However, in this embodiment, a pair of movable lenses 176, 177 are provided before (relative to the direction of travel of the laser beam) the tiltable mirrors 175 for focusing the laser beam as the deflection angle changes. Movement of the focusing lenses 176, 177 is controlled synchronously with movement of the tiltable mirrors 175. The focusing lenses 176, 177 may be movable towards and away from each other in a linear direction by an actuator, such as a voice coil 184.

The tiltable mirrors 175 and focusing lenses 176, 177 are selected appropriately to transmit both the laser wavelength, which is typically 1064 nm, and wavelengths of the collected radiation emitted from the melt pool.

A beam splitter 178 is provided between the focusing lenses 176, 177 and the laser 105 and measuring devices 172, 173. The beam splitter 178 is a notch filter that reflects light of the laser wavelength but allows light of other wavelengths to pass therethrough. Laser light is reflected towards the focusing lenses 176, 177 and light that is collected by the scanning optics that is not of the laser wavelength is transmitted to measuring aperture 171.

The optical module 106 further comprises a heat dump 181 for capturing laser light that is transmitted through the beam splitter 178. The majority of the laser light is, as intended, reflected by the beam splitter 178. However, a very small proportion of the laser light passes through the beam splitter 178 and this small proportion of laser light is captured by the heat dump 181. In this embodiment, the heat dump 181 comprises a central cone 182 that reflects light onto a scattering surface 183 located on the walls of the heat dump 181. The scattering surface 183 may be a surface having a corrugated or ridged surface that disperses the laser light. For example, the scattering surface 183 may comprise a ridge having a helix or spiral shape. The scattering surface may be made from anodised aluminium. A photodiode may be provided in the beam dump as a means of monitoring laser power.

Various measuring devices can be connected to the measuring aperture 171. In this embodiment, a spectrometer 172 and a photodiode 173 are provided for measuring the radiation collected by the optical scanner. A further beam splitter 185 splits the radiation deflected into aperture 171 to direct a proportion of the radiation to spectrometer 172 and a proportion to photodiode 173.

The selective laser solidification apparatus further comprises a visible camera 191 and an infra-red (thermal) camera 192 for capturing images of the material bed 104 and acoustic sensors 197, 198 for recording acoustic signals generated during the build.

In use, the computer 160 receives a build file comprising instructions in the form of scan paths and scan parameters to be used in the formation of each layer of the additive build and a plurality of acceptable process variations for each sensor during the build of the workpiece. The acceptable process variations for the build comprises an acceptable range of values for sensor signals of the apparatus. The acceptable range of values may be absolute values of the sensor signals, values derived from the sensor signals, rates of change in the sensor signals, accumulating error in the sensor signals and/or an integral of a windowing function. For example, the acceptable process variation may be an acceptable variation in a position of the platform 102 from a nominal position, an acceptable variation in a position and/or speed of the wiper 108 from a nominal position/speed, an acceptable variation in the gas pressure of the build chamber 101, an acceptable variation in an oxygen concentration in the build chamber 101, an acceptable variation in signals from the spectrometer 172 and/or photodiode 173, an acceptable variation in the signals from the acoustic sensors 197, 198, an acceptable variation in a temperature of the powder bed 104 (derived from the thermal camera 192), an acceptable variation in the signals form the photodiode measuring delivered laser power and an acceptable process variation in a difference between images of adjacent layers captured by the visible camera 191. For each sensor signal the acceptable range of values is dependent on the state of progression of the build, for example, the acceptable range of values may vary with a position of the workpiece that is being formed, a layer number being processed and/or a build time.

The acceptable process variations are particular to a specific build and, as such, form part of the build file that is sent to the additive manufacturing apparatus for instructing the apparatus in the building of the workpiece.

The computer 160 controls the various modules of the selective laser melting apparatus in accordance with the scanning instructions to build the workpiece. During the build, the computer receives signals from sensors 172, 173, 191, 192, 193, 194, 195, 197, 198, I-4 and I-2. The computer 160 determines whether the signals or values derived from the signals (such as temperature of the melt pool) are within the acceptable process variations specified in the build file.

Figure 4:
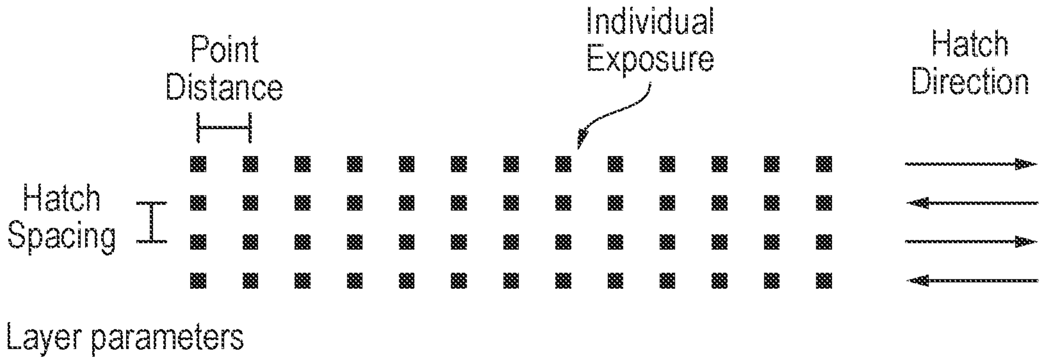
FIG. 4 shows the point scanning strategy used by the SLM apparatus.

In the event the signals or values derived from the signals are outside of the acceptable process variation, the computer 160 controls the selective laser melting apparatus to take appropriate action. For example, the computer 160 may cause a halt to the additive building process. This may be done in the case of the oxygen concentration or pressure in the build chamber being outside of the acceptable process variation. In the case of the melt pool temperature being outside of or moving towards an outer limit of the acceptable process variation, the computer 160 may alter the laser beam power to achieve a melt pool temperature within the acceptable process variation. In the case of the load cell on the wiper 108 detecting a projection from the powder bed 104, the computer generates a user alert to bring an operator's attention to the projection/defect. In the case of a visible image of a powder layer being different to the powder layer of a previous layer outside of the acceptable process variation, a re-dosing of the powder layer may be instructed by the computer 160. In the case of an imaging processing technique detecting lines in a visible image of the powder layer outside of the acceptable process variation, damage to the wiper may be suspected and the computer may generate an alert flagging the potential damage to the wiper to the operator. In the case of the images of the thermal camera being outside on an acceptable process variation, changes may be made to the scan parameters and/or scanning order/strategies to change the energy density input into the subsequent layer by the laser beam. Referring to FIG. 4, the scan parameters that can be changed are laser power, spot size, point distance, and exposure time.

The additive manufacturing apparatus may also be controlled to re-inspect a region of the build that has generated sensor signals outside of the acceptable process variation. For example, during a period in which material is not being consolidated with the laser beam, such as during spreading of the layer with the wiper 108 or lowering of the build platform 102, the steering mirrors 175 of the optical module 106 may be directed to the capture further radiation emitted from the identified region. The apparatus may be controlled to expose the identified region to the laser beam at a low power, below that required to consolidate (melt to sinter) the material, in order to heat the region such that defects/failures in the build can be determined from the heat signature generated during heating of the region with the low power laser beam.

The computer 160 is arranged to store in memory 162 a log of the states of progression of the build for which the sensor signals fell outside the corresponding acceptable process variation. The storing of sensor signals may comprise pre- and/or post-triggering in which sensor signals around the sensor signals that triggered the storage of sensor data are stored. The processor 161 may cause the display 163 to display a 2-D or 3-D representation of the workpiece 103 which indicates the regions of the workpiece 103, which, when formed, generated sensor signals outside of the acceptable process variation. The computer 160 may also store the sensor data for these regions such that this data can be reviewed by a user wishes to drill further into the process variation that occurred.

Figure 5:
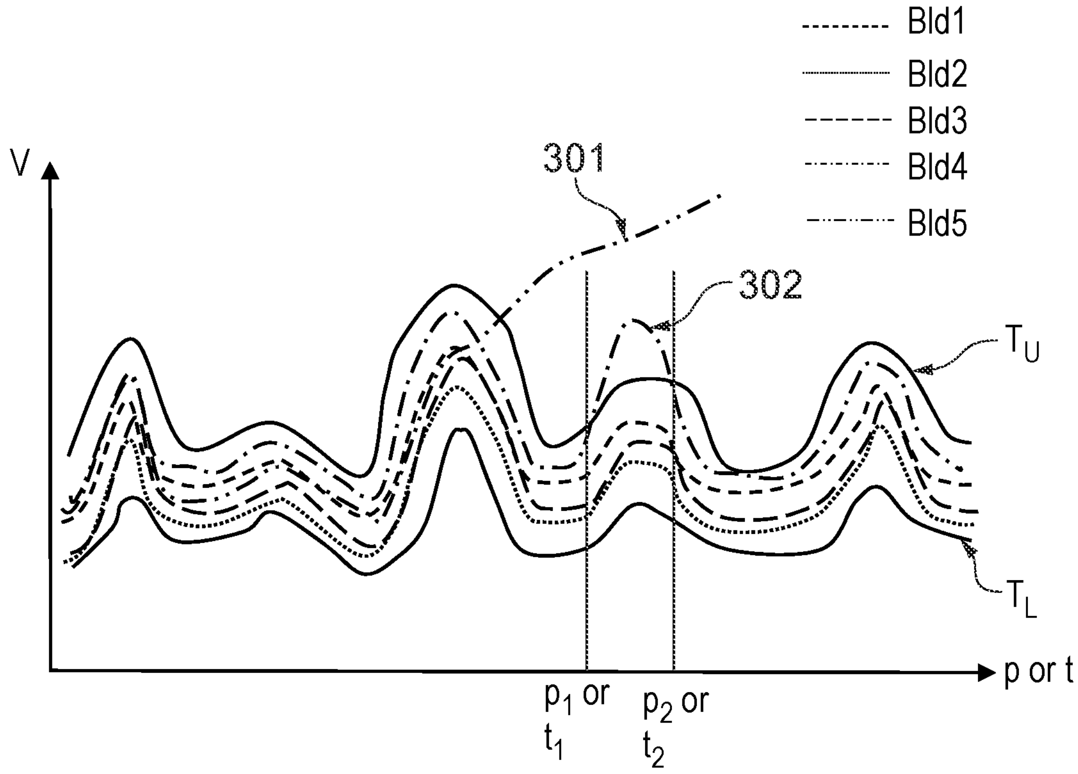
FIG. 5 is a schematic representation of sensor signals that may be generated by a plurality of builds of nominally identical workpieces.
Figure 6:
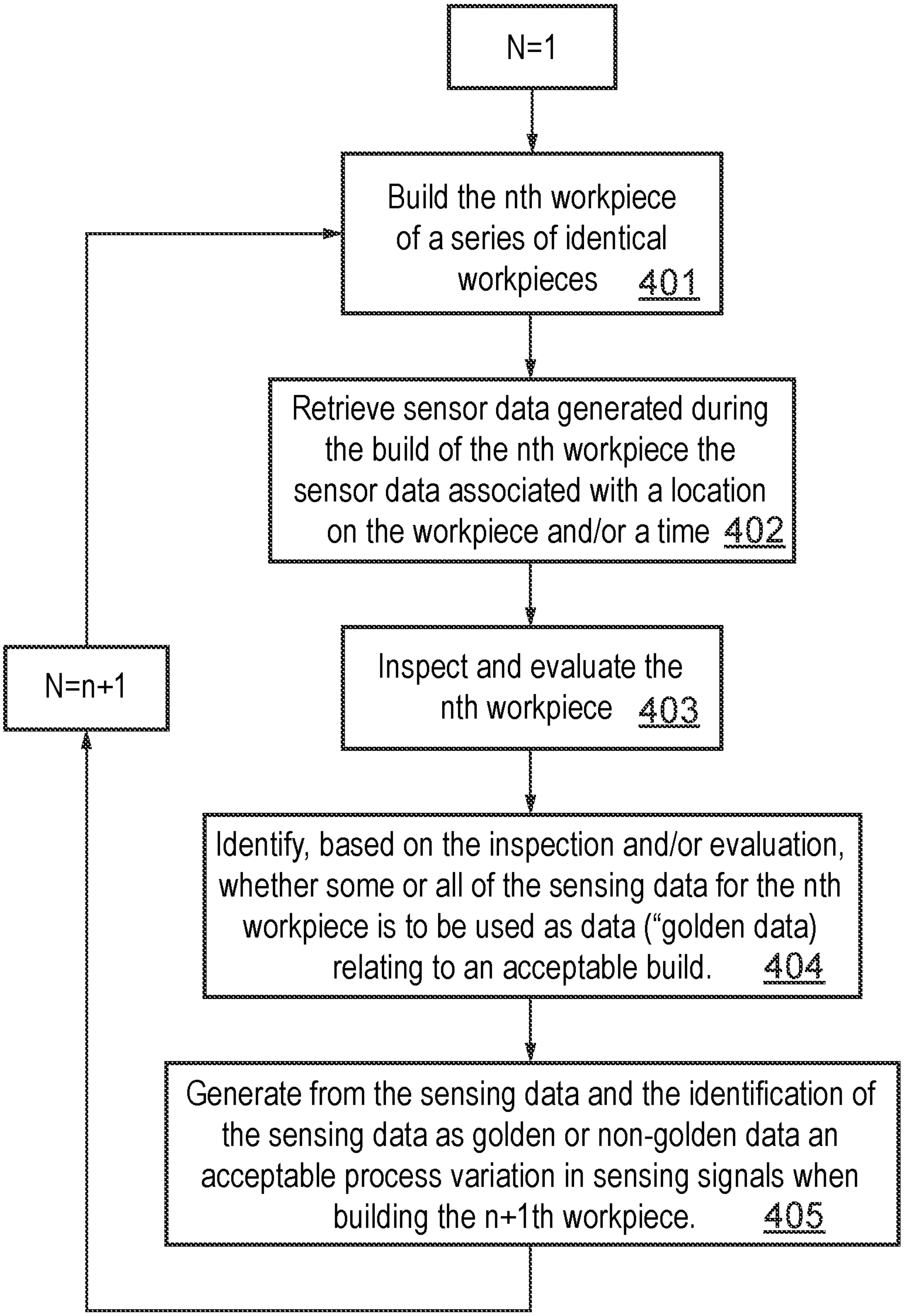
FIG. 6 is a flowchart illustrating a method in accordance with an embodiment of the invention.

Referring to FIGS. 5 and 6, a method of determining an acceptable process variation of the building of a workpiece will now be described. The acceptable process variation is determined from building a series of identical workpieces in accordance with a common set of build instructions. A first one of the workpieces is built using an initial set of acceptable process variations, such as limits set to protect the apparatus from damage, such as damage to the wiper caused by regions projecting above the powder bed, or as determined from previous builds, such as previous iterations of the build or builds of other workpieces with the same material. The initial set of acceptable process variations should be set sufficiently broad so as to capture at least a majority of values of the sensors that are likely to result in a build meeting the user specified requirements. For example, the initial set of acceptable process variations may exclude laser parameters that do not achieve sufficient energy density to melt the powder.

The first workpiece of the series of workpieces is built 401 and sensor data comprising sensor signals generated during the build are retrieved 402. The sensor signals are associated with a state of progression of the build when the sensor signals were recorded/captured, such as a positon on the workpiece or layer being consolidated or a build time. The sensor signals may be plotted as a function of position, p, or time, t, as shown in FIG. 5, which shows the sensor data, V, for builds 1 to 5 plotted on the same graph.

The workpiece is then inspected, for example by using non-destructive and destructive techniques, and evaluated 403 to determine if the workpiece meets specified requirements. For example, the specified requirements may be density of the workpiece, number of inclusions in the workpiece, strength of the workpiece and/or surface finish of the workpiece, average grain size and/or dimensions as determined in accordance with standard methodology. If a region of the workpiece is evaluated to not meet the specified requirements then the user identifies whether the failure is a systematic failure affecting the entire or a major percentage of the workpiece or is a failure local to the region. Two examples are shown in FIG. 5, a non-recoverable failure 301, wherein the sensor values do not return to be within acceptable process variation limits $T_U$ and $T_L$, and a recoverable build failure, wherein the sensor values do return to be within acceptable process variation limits $T_U$ and $T_L$. The former indicates a systematic failure and all the sensor data (or at least the sensor data from the point at which the sensor signals start to diverge) is identified as relating to an unacceptable build (i.e. non-golden data). The latter indicates a localised failure and the user may deem that such a failure does not adversely impact on the rest of build and, accordingly, only the sensor data for the failed region is identified as relating to a failed build (i.e. non-golden data) and other portions of the sensor data for the build is identified as relating to an acceptable build (i.e. golden data).

From the sensor data and identification of the sensor data as golden and non-golden, an acceptable process variation is determined 404 for each state of progression of the build for which sensor signals are generated. The acceptable process variation may be determined by any suitable statistical analysis. This may result in an envelope of acceptable sensor values, as shown in FIG. 5 by the upper $T_U$ and lower $T_L$ thresholds.

The method then comprises building the next workpiece in the series and updating the acceptable process variations based upon the sensor data generated during the build of that workpiece. This process is carried out until a predefined condition is met, such as when a change in the acceptable process variation between builds falls below a predefined level.

Figure 7:
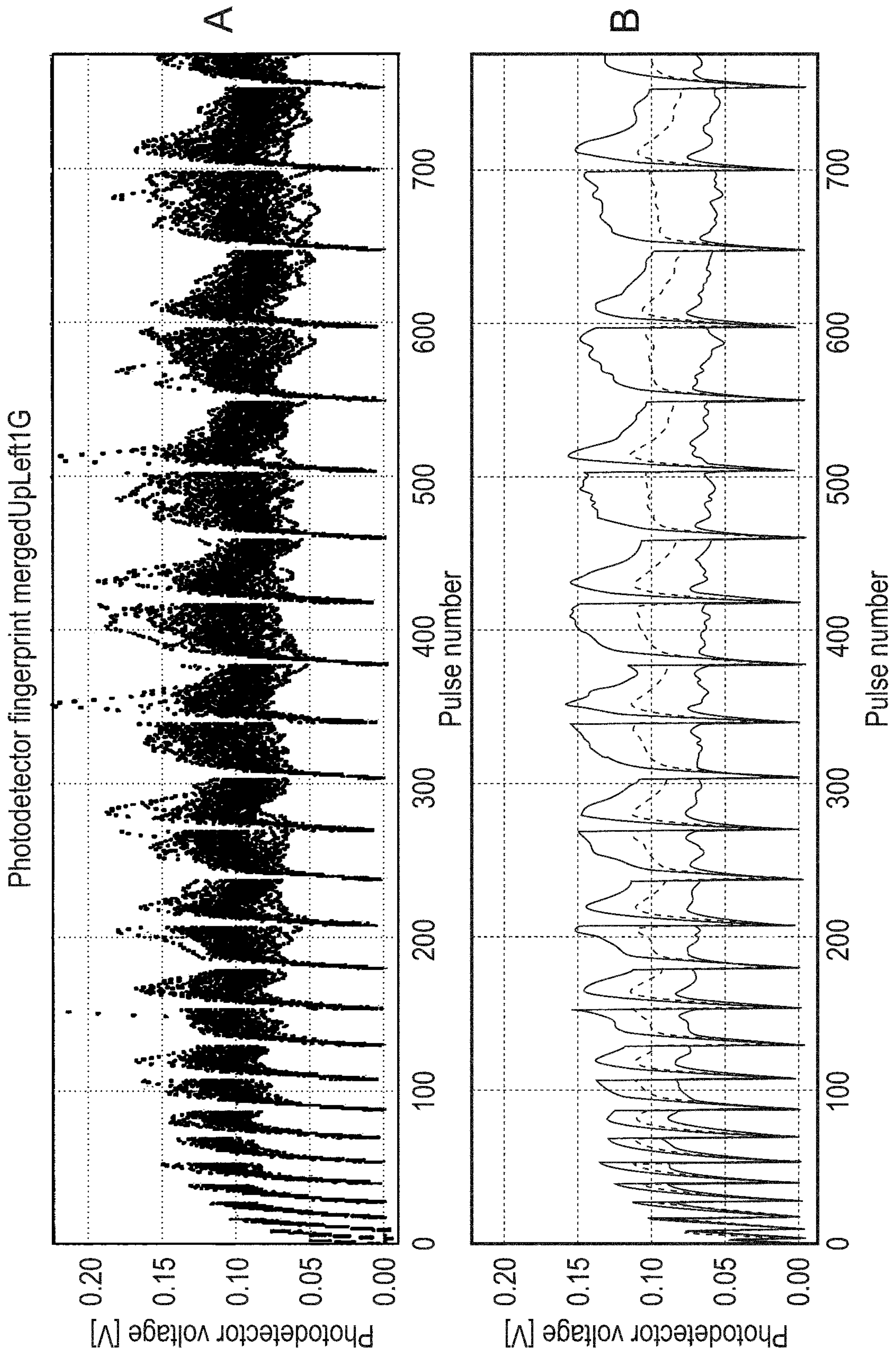
FIG. 7 are graphs showing photodiode data on a point by point basis captured when carrying out a number of hatches of a scan of a layer.

FIG. 7 shows sensor signals received from the photodiode 173 during a raster scan of a square geometry at an angle of 45 degrees to the edges of the square. The photodetector voltages are plotted as a function of pulse number (i.e. a point exposure number). For a 60 microsecond exposure time, approximately 30 photodetector samples are collected for each point exposure. The top graph, 7A, is the raw data and the bottom graph, 7B, shows the mean and the mean plus and minus two standard deviations for each pulse number. The separation between each hatch line can be identified from the large dip in the photodetector voltage. Furthermore, it can be seen that the fingerprint for the photodetector voltage for each hatch scan changes both during each hatch and is dependent on, amongst other things, a length of the hatch and the direction of the hatch in relation to gas flow through the build chamber 120 (the photodetector voltage increasing or decreasing during the hatch dependent on the hatch direction relative to the gas flow).

From this data it is clear that defining acceptable process variations for the photodetector voltage based upon the type of scan (in this case raster scan) being carried out is unlikely alone to sufficiently capture the true range of acceptable process variations for producing a workpiece that meets specified requirements.

Accordingly, as described above, acceptable process variations are determined for each exposure point and the sensor signals collected for the exposure point compared to the acceptable process variations for that exposure point. The exposure point may be defined by a number/order (as in the graphs), position on the workpiece or build time. The acceptable process variations may be a variation in the mean photodetector voltage of that point, a maximum and minimum photodetector voltage and/or an acceptable standard deviation, RMS, cluster analysis, shape of a histogram of photodetector values, variation in a standard deviation, changes in a ratio of different signals, a rolling average and/or a filtered or smoothed mean.

For additive manufacturing apparatus with only a single or few detectors for sensing attributes of the additive process, one-to-one correlation between an acceptable process variation and a state of progression of the build, such as an exposure point and/or layer number, may be practical. However, as the number of detectors used to monitor the additive process and the complexity of the acceptable process variations increases, the amount of data on the acceptable process variations becomes extremely large. For example, for the apparatus disclosed above, sensor signals for each exposure point may be generated by the photodetector 173, the spectrometer 172 and acoustic sensors 197, 198 and a number of acceptable process ranges may be used for the sensor signals generated by each detector 172, 173, 197, 198. Storing such acceptable process variations for each state of progression of the build, in particular, each exposure point, may result in a prohibitively large data file.

Figure 8:
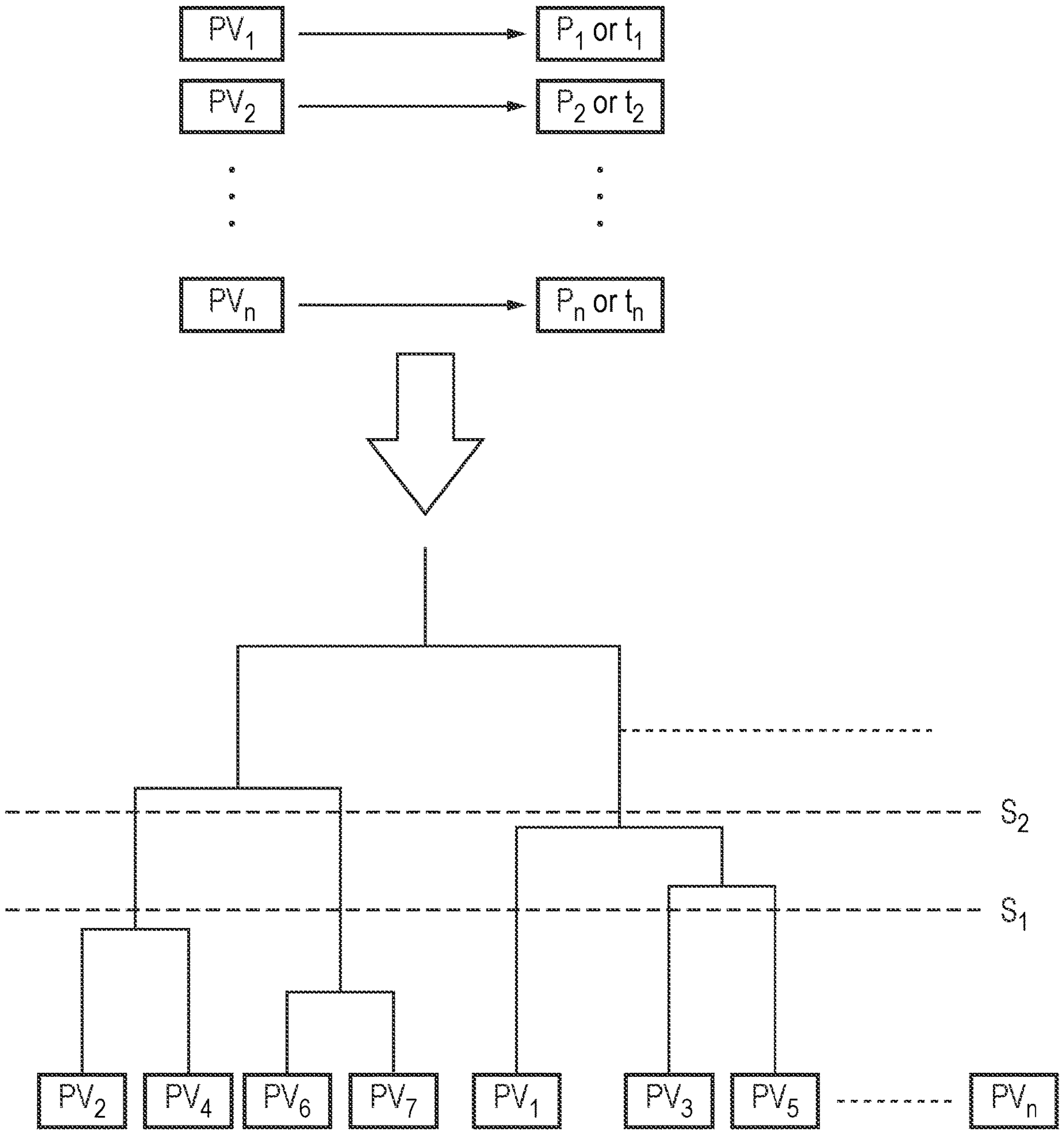
FIG. 8 is a schematic representation of an association of primary acceptable process variations to a state of progression of a build of a workpiece and a hierarchical clustering algorithm for clustering the primary acceptable process variations based upon a measure of similarity.
Figure 9:
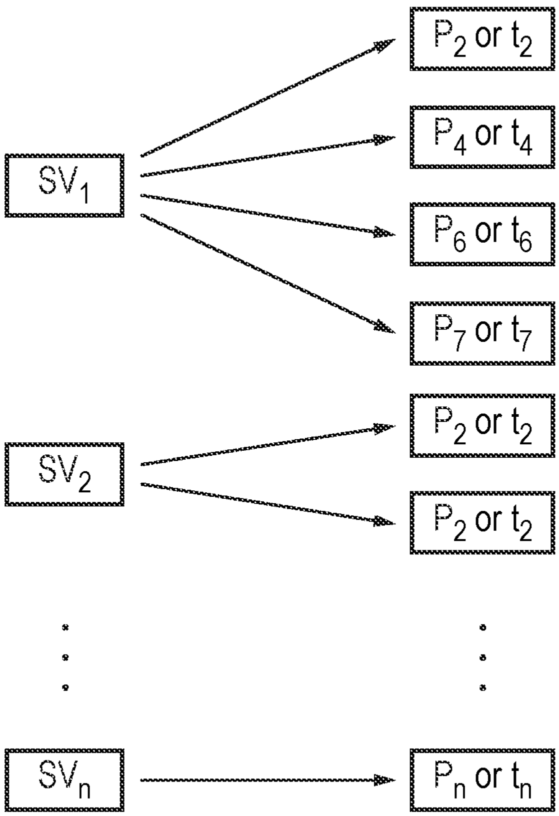
FIG. 9 is a schematic representation of an association of secondary acceptable process variations to states of progression of a build of a workpiece in a one-to-many relationship.

Referring to FIGS. 8 and 9, to reduce the amount of data on acceptable process variations required for controlling the build, the primary acceptable process variations, PV, determined for each state of progression of the build, may be clustered (grouped) based upon a measure of similarity (for example, using a suitable clustering algorithm, such as a hierarchical clustering algorithm). This is represented in the tree structure in FIG. 8, wherein the degree of similarity of the primary acceptable process variations is indicated by the location of the branching in the vertical axis. A new secondary acceptable process, SV, variation is generated for each cluster from the primary acceptable process variations PV within the cluster, the secondary acceptable process variation SV used for all states of progression associated with the primary acceptable variations that fall within the cluster. The resultant one-to-many relationship is shown in FIG. 9.

The degree of similarity $S_1$, $S_2$ required for grouping the primary acceptable variations PV may be selected by the user and may be different for different regions of the workpiece. For example, the user may set a high degree of similarity for problematic regions, such as overhangs, or critical regions of the workpiece, for which tight control of the process is desirable, but set a low degree of similarity for non-problematic or non-critical regions, for which failure of the part to meet specified requirements is less critical.

Figure 10:
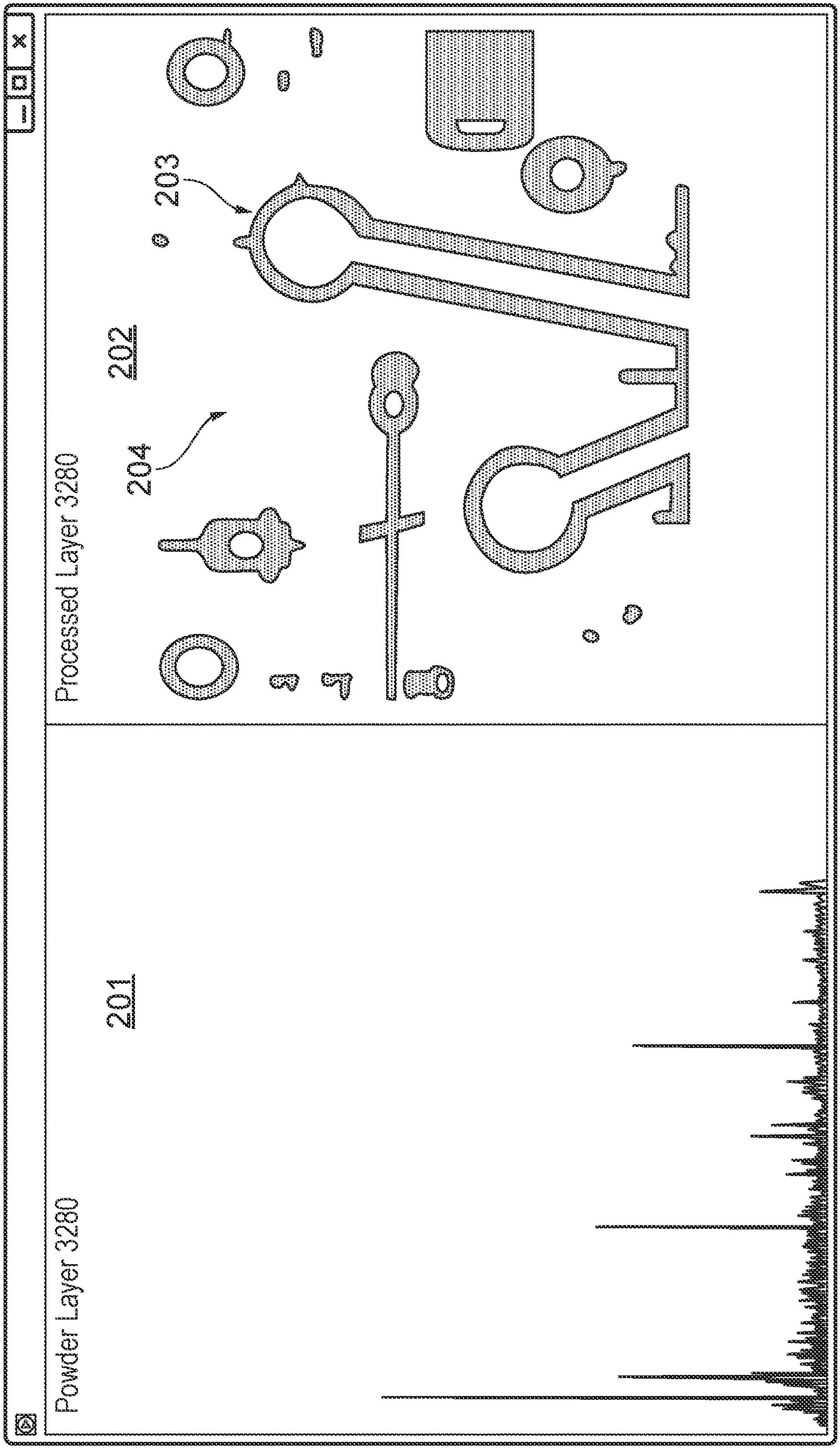
FIG. 10 shows images taken by a visible camera of layer in a selective laser melting apparatus both before and after solidification of material of the layer.

A further example of sensor data that may be used in the above described method will now be described with reference to FIG. 10. FIG. 10 shows an image 201 of a powder layer before processing and an image 202 of the processed layer as captured by a visible camera in a SLM apparatus is shown. As can be seen the consolidated material 203 is clearly distinguishable from the unconsolidated powder 204. The computer 160 analyses images 201 of powder layers (before consolidation) by comparing the images of consecutive layers. Firstly, the images are rectified to ensure the images are orthogonal and then a histogram is generated of the resulting image obtained when subtracting the image 201 of the previous powder layer from the image 201 of the current powder layer using each colour channel and summing the results to provide counts of pixels for each bin of the histogram (each bin relating to an interval of differences between the images 201). A single output value for the difference between the two images 201 is then generated by a weighted calculation of the histogram data such that pixel counts of a higher magnitude difference interval are more heavily weighted to provide a greater contribution to the single value output. In this way, the counts in bins corresponding to a larger contrast provide a greater contribution to the output value relative to the magnitude of the contrast compared to counts in bins for a smaller contrast. Accordingly, the pixels with small differences have little effect on the final output value, effectively filtering output small differences that can occur because of noise inherent in the images 201.

The computer 160 determines whether the output value representing the difference between the two images 201 is within an acceptable process variation for that layer, such as below a threshold level. If the value is outside (above) the acceptable process variation it is determined that consolidated material is more prominent in one of the images than the other and an abnormal build event has occurred. In response, the computer 160 may instruct the dosing wiper mechanism 108, 109 to re-dose the powder layer to determine if the large differences in the images 201 was caused by incomplete dosing. If the image of the re-dosed layer compared to the image 201 of the previous layer still produces output values outside of the acceptable process variation, an alert may be generated for the operator to visually inspect the layer for abnormalities, such as projections of solid material through the powder layer.

The graph in FIG. 10 is a graph of the single output value for a number of layers of a build showing spikes in the output value for certain layers. The computer may generate a display as shown in FIG. 10, allowing an operator/user to quickly identify an image to be reviewed by selecting a value on the graph, such as a high value (spike), the computer 160 displaying on display 163, an image 201 of the powder layer that generated that output value. In this way, the operator/user can visually review the image to determine what has caused the spike in the output value.

Rather than generating a single output value for the entire image comparison, output values may be generated, in a similar manner, for sections of the image comparison. In this way, the section of the powder layer that results in large differences between the image of the powder layer and that of the previous layer can be identified. This may help identify the problem. For example, an alert generated for the operator may specify an approximate location on the powder layer that has caused the alert to be generated.

The sections may be columns or rows of the image extending in the direction of travel of the wiper blade. An output value for each column/row will give an indication of whether a linear artefact, such as a ridge of powder, is present in that column or row. The presence of a raised ridge may indicate that the wiper 108 has been damaged. Accordingly, in detecting an output value for a column/row above a threshold value, the computer 160 may generate an alert for the operator to check the wiper 108 for damage.

A similar process can be carried out on the thermal images to determine failures in dosing or curling of the workpiece as the solidified material generates a different thermal image to that of the powder.

Furthermore, each image may be formed from the photodiode outputs for a layer. The exposure points for which photodiode data is collected effectively form a picture of the workpiece and an acceptable variation between consecutive layers of photodiode data may be known from previous build of the workpiece. The method of analysing consecutive images as described above may provide a quick indication that the build process has moved outside of an acceptable process window. In particular, the photodiode response to the laser beam striking solidified material is significantly different from the response when striking powder.

Images from the thermal camera may be further used to determine a rate of cooling of the solidified material. A series of thermal images of a layer may be captured during solidification of the material and a rate of cooling determined from a change in intensity of a recently solidified area between different thermal images of the area captured at different times. The determined rate of cooling is then compared to an acceptable process variation in the rate of cooling. If the rate of cooling is outside of the acceptable process variation the computer 160 may change the scanning parameters to change the energy per unit area input into the material. There may be different acceptable process variations for the rate of cooling for different areas of the solidified material based upon geometry of the workpiece. In particular, an acceptable process variation for the rate of cooling may be different for a layer of solidified material formed on powder of the previous layer, such as an overhang, compared to solidified material formed on solidified material of the previous layer. In a further embodiment, the rate of cooling for the workpiece is modelled and the acceptable process variation in the cooling rate is a variation from a modelled cooling rate.

The acceptable process variation for the cooling rate may have been determined from carrying our previous builds with the material in accordance with the method as described with reference to FIGS. 5 and 6.

A map of the rate of cooling measured across a layer may be displayed to the user on display 163. The colour coded map may be displayed to the user with different colours for different rates of cooling.

The invention provides a method of controlling the additive manufacturing apparatus based upon acceptable process variations determined from data generated for previous layers of the build of the workpiece and/or for one or more previous builds. This avoids the need for a comprehensive understanding of the complex processes that occur in an additive manufacturing apparatus.

The acceptable process variations form part of the build file sent to an additive manufacturing apparatus for instructing the additive manufacturing apparatus to carry out the build. As the acceptable process variations are embedded into the build file, rather a separate, possibly over-writeable file on the SLM machine, the build files provide a traceable source for identifying the evolution of the acceptable process variations. Such traceability may be useful in certain manufacturing industries, such as the aerospace industry, wherein documenting the history of a product is required.

Regression testing may be used to demonstrate that the acceptable process variations are still valid for a new additive manufacturing machine having design modifications and/or new features/functionality. This regression testing may be carried out for the new machine performing in accordance with new specifications and/or the new machine configured to emulate the functionality of the old machine.

Figure 11:
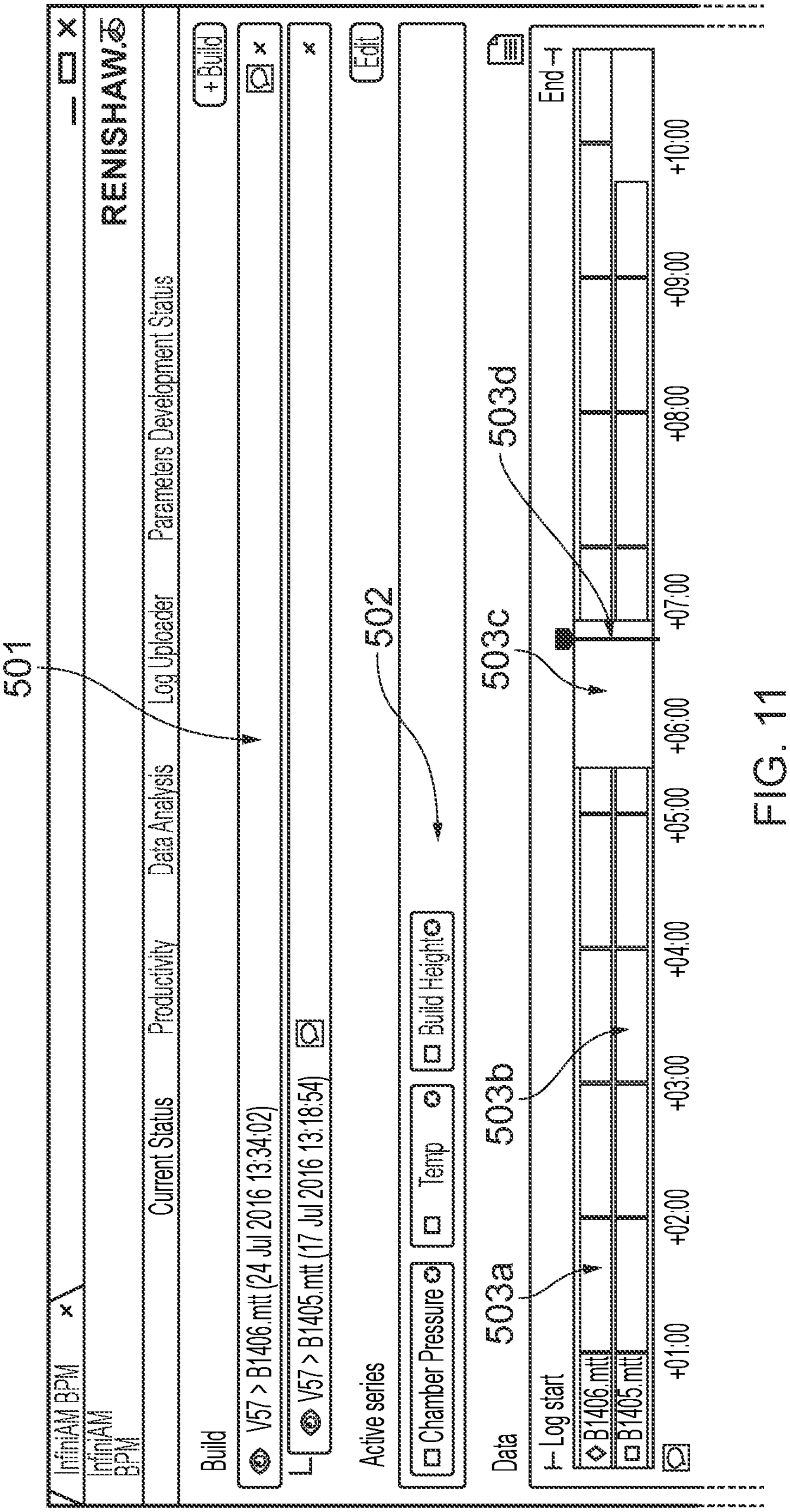
FIG. 11 illustrates a visualisation device for representing the sensor data together with the acceptable process variations.
Figure 11:
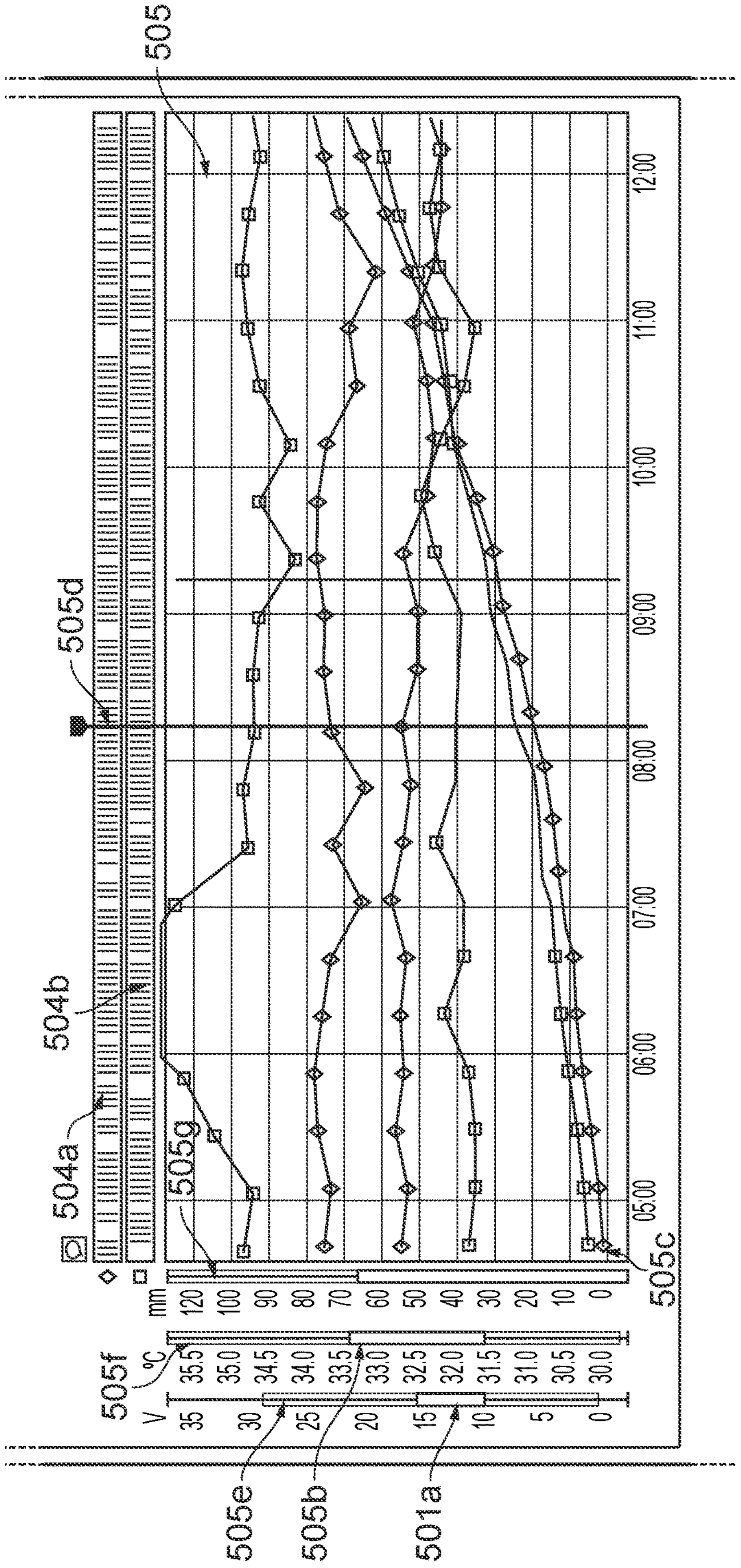
Figure 11:
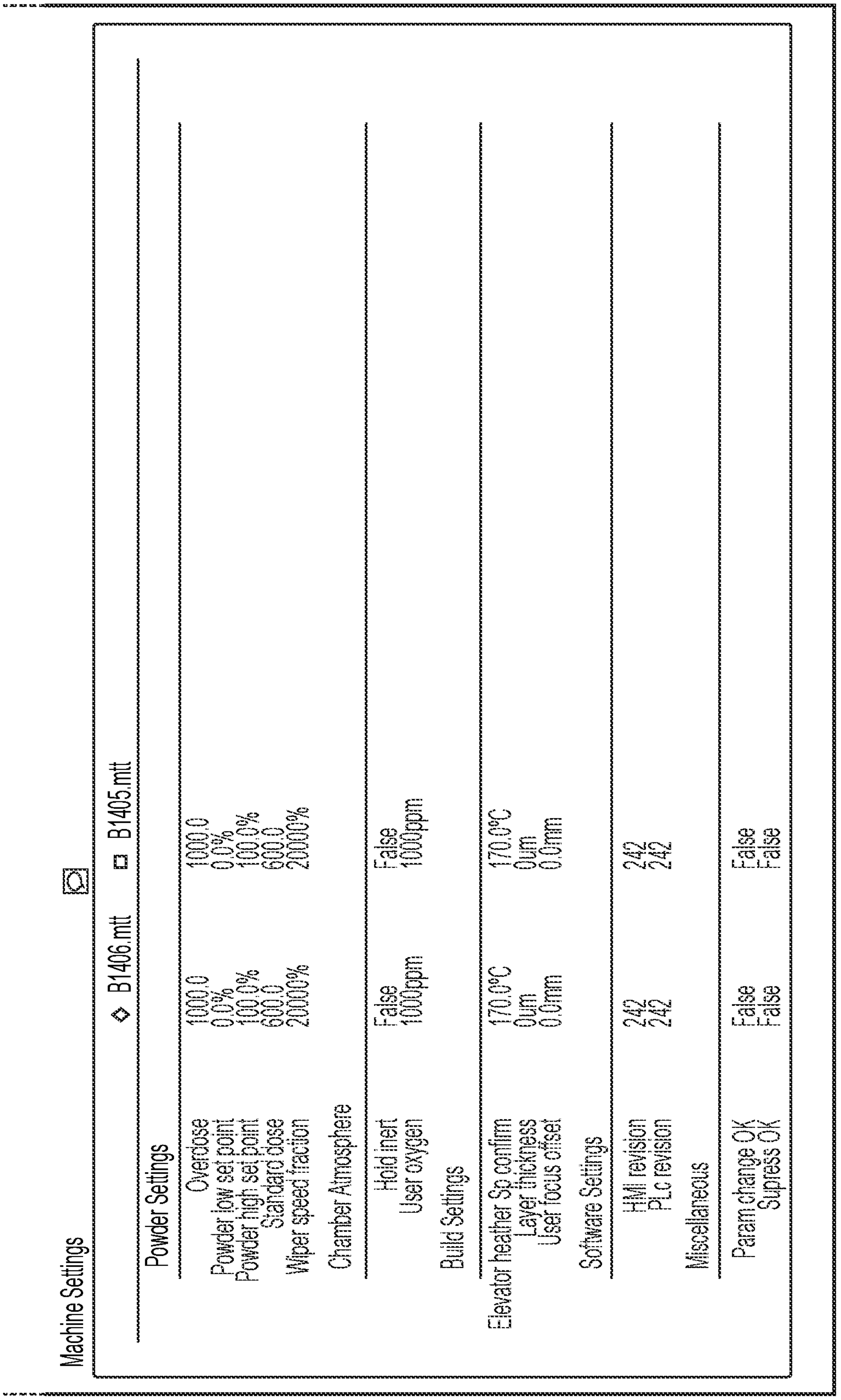

FIG. 11 shows an embodiment of a representation of visualisation apparatus according to an embodiment of the invention. The visualisation apparatus is arranged to allow the display of sensor data from multiple nominally identical builds to be displayed for comparison as well as allowing the user to determine whether a sensor signal falls outside an acceptable process variation for the state of progression of the build when the sensor signal was captured. At the top 501 of the display are the two builds B1406.mtt and B1405.mtt selected by the user, both builds having been carried out by the same additive manufacturing apparatus V57. The selection of the builds may be achieved using any appropriate input device, such as a pointing device from an appropriate menu. The next box 502 displays the sensor data selected for display. In this representation, the sensor data is chamber pressure, chamber temperature and build height.

Time bars 503*a* and 503*b* illustrate times during the build. Time bar 503*a* is for build B1406.mtt and time bar 503*b* is for build B1405.mtt. The shaded window 503*c* illustrates the time period of the builds for which sensor signals are displayed in the graph 505 below. The shaded window 503*c* can be moved to select different times during the build and the width of the window adjusted to display more or less data on the graph. A marker 503*d* is positioned to mark sensor signals of interest. It is possible to locate more than one marker on the time bars 503*a* and 503*b*. In FIG. 11, the time bars 503*a* and 503*b* are aligned based upon start time, however, other alignments may be made for example, based upon end time.

Bars 504*a* and 504*b* represent the layers (using lines) of each build that fall within the window 503*c*. The user is able to manipulate the bars 504 and 504*b* to align like layers such that data of these like layer scan be compared. Due to differences in the builds, it is possible that nominally identical layers of the nominally identical builds do not align based upon alignment of the start times and therefore, a further adjustment may have to be made.

The graph 505 shows the values for the sensor signals of the selected series for the selected window 503*d*. Means is provided for indicating a full range of the sensor values for each series. In this embodiment, the indication of the full range is the thin line of the scale. The user can zoom in from this full range for each series, in this embodiment through manipulation of the dark shaded bars 505*a*, 505*b*, 505*c*, with the scale of the graph for that series being adjusted to the indicated sub-range.

A marker 505*d* can be moved through the sensor data displayed in the graph. The acceptable process variation for each series at the state of progression where the marker 505*d* is located by be indicated on the scale by the lightly shaded bar 505*e*. 505*f*, 505*g*. This acceptable process variation may also be projected onto the graph as a translucent area similar to the varying boundaries $T_U$ and $T_L$ shown in FIG. 5. The user may be able to select which acceptable process variations are displayed as a translucent image through selection of the appropriate data series with a pointing device. Overlay of multiple translucent areas for multiple data series may provide an otherwise confusing representation of the data.

From these indications of the acceptable process variation, the user can quickly determine whether the values for the sensor signals fall outside the acceptable range. Also, by being able to compare nominally identical builds and align the data according to a state pf progression of the build, it is possible to compare the builds. Such a comparison may be useful in determining why two nominally identical builds resulted in different outcomes. As such, the visualisation apparatus provides a useful took to be used in the manufacturing process and for the design of a manufacturing process.

The visualisation apparatus may provide means for uploading a method for determining acceptable process variations from the sensor signals of a plurality of builds. In this way, users can customize the statistical analysis to their requirements. The user can indicate which builds met acceptance requirements and should be considered "golden builds" and which builds failed to meet these requirements. The statistical methods may use these indications for the determination of the acceptable process variations. The acceptable process variations may be updated as new build data is added to the apparatus. For example, in a manufacturing facility manufacturing a plurality of nominally identical parts, each additive manufacturing apparatus may report data during and/or after the build and the apparatus modifies the acceptable process variation based upon the reported sensor data.

It will be understood that modifications and alterations may be made to the above described embodiments without departing form the invention as defined herein. For example, the invention is not limited to powder bed additive manufacturing processes as described above, but could be used in other additive manufacturing processes, such as wire arc additive manufacturing in which a metal wire is melted using a plasma arc to form a workpiece in a layer-by-layer manner.

The invention claimed is:

1. A method of monitoring an additive manufacturing apparatus comprising an optical scanner comprising tiltable mirrors for scanning a laser beam across a powder bed to consolidate powder, and a photodetector mounted to receive radiation that travels from the powder bed to the photodetector via reflection by the tiltable mirrors, the photodetector generating sensor signals in response to the received radiation, the method comprising:

receiving the sensor signals generated by the photodetector during a build;

comparing each sensor signal or a value derived from a plurality of the sensor signals to a corresponding acceptable process variation of a plurality of acceptable process variations for the build; and generating a log based upon the comparisons, wherein each acceptable process variation of the plurality of acceptable process variations is associated with a state of progression of the build and the corresponding acceptable process variation is the acceptable process variation associated with the state of progression during the build when the sensor signal or the plurality of the sensor signals are generated.

2. A method according to claim 1, wherein the state of progression is an order in which the sensor signals are generated in the build.

3. A method according to claim 2, wherein the acceptable process variations are in an ordered list corresponding to the order in which the sensor signals are generated during the build and the method comprises determining the corresponding acceptable process variation from the order in which the sensor signal or the plurality of the sensor signals are generated during the build.

4. A method according to claim 1, wherein the state of progression is a time from a set event in the build.

5. A method according to claim 2, wherein each acceptable process variation is associated with at least one build time and the method comprises determining the corresponding acceptable process variation from a build time when the sensor signal or the plurality of the sensor signals are generated during the build.

6. A method according to claim 1, wherein the photodetector is a photodiode.

7. A method according to claim 1, comprising comparing each value derived from the plurality of the sensor signals to the corresponding acceptable process variation.

8. A method according to claim 7, wherein the plurality of the sensor signals is collected over tens of microseconds.

9. A method according to claim 7, wherein the value is a mean of the plurality of the sensor signals.

10. A method according to claim 1, comprising displaying a 2- or 3-dimensional representation identifying suspect regions of the build, which, during formation, generated sensor signals outside the corresponding acceptable process variations.

11. A method according to claim 1 comprising using a mapping to transform the acceptable process variations determined for one position in a build volume to acceptable process variations suitable for a position in the build volume for the build in which the sensor signals are generated.

12. A method of monitoring an additive manufacturing apparatus comprising an optical scanner comprising tiltable mirrors for scanning a laser beam across a powder bed to consolidate powder, and a photodetector mounted to receive radiation that travels from the powder bed to the photodetector via reflection by the tiltable mirrors, the photodetector generating sensor signals in response to the received radiation, the method comprising:— receiving the sensor signals generated by the photodetector during a build;

comparing the sensor signals or values derived from a plurality of the sensor signals to a fingerprint of sensing data for states of progression of the build, the sensing data derived from builds evaluated as meeting specified requirements; and generating a log based upon the comparisons, wherein the fingerprint comprises an ordered list of sensing data corresponding to the order in which the sensor signals are generated during the build and the method comprises comparing the sensor signals to corresponding sensing data of the fingerprint from the order in which the sensor signal or the plurality of the sensor signals are generated during the build.

13. A method according to claim 12, wherein the states of progression are times from a set event in the build.

14. A method according to claim 12, wherein the sensing data is associated with build times and the method comprises comparing the sensor signals to corresponding sensing data of the fingerprint determined from a build time when the sensor signal or the plurality of the sensor signals are generated during the build.

15. A method according to claim 12, wherein the photodetector is a photodiode.

16. A method according to claim 12, comprising comparing each value derived from the plurality of the sensor signals to the fingerprint of sensing data.

17. A method according to claim 16, wherein the plurality of the sensor signals is collected over tens of microseconds.

18. A method according to claim 16, wherein the value is a mean of the plurality of the sensor signals.

19. A method according to claim 12, comprising displaying a 2- or 3-dimensional representation identifying suspect regions of the build identified from comparing the sensor signals or values derived from a plurality of the sensor signals to a fingerprint of sensing data.

20. A method according to claim 12 comprising using a mapping to transform the fingerprint determined for one position in a build volume to a fingerprint suitable for a position in the build volume for the build in which the sensor signals are generated.

21. A method of monitoring an additive manufacturing apparatus comprising a scanner for scanning an energy beam across a powder bed to consolidate powder of the powder bed at a plurality of exposure points, the method comprising:

receiving sensor signals from the additive manufacturing apparatus during a build of a workpiece, the sensor signals generated when exposure points on the powder bed are exposed to the energy beam to consolidate powder, comparing each sensor signal or a value derived from a plurality of the sensor signals to a corresponding acceptable process variation of a plurality of acceptable process variations for the build; and generating a log based upon the comparisons, wherein each acceptable process variation of the plurality of acceptable process variations is associated with an exposure point of the build and the corresponding acceptable process variation is the acceptable process variation associated with the exposure point being exposed to the energy beam when the sensor signal or the plurality of sensor signals are generated.

22. A method according to claim 21, wherein the scanner comprises tiltable mirrors for scanning a laser beam across the powder bed to consolidate powder and a photodetector mounted to receive radiation from the powder bed to the photodetector via reflection by the tiltable mirrors, wherein the photodetector generates the sensor signals in response to the received radiation.

23. A method according to claim 21, wherein there is a one-to-one correlation between exposure points and acceptable process variations.

* * * * *